(12) United States Patent
McMillan

(10) Patent No.: US 10,698,306 B2
(45) Date of Patent: Jun. 30, 2020

(54) LIGHT ASSEMBLY FOR A PROJECTOR

(71) Applicant: George Erik McMillan, Hickory, NC (US)

(72) Inventor: George Erik McMillan, Hickory, NC (US)

(73) Assignee: George Erik McMillan, Hickory, NC (US)

( * ) Notice: Subject to any disclaimer, the term of this patent is extended or adjusted under 35 U.S.C. 154(b) by 0 days.

(21) Appl. No.: 16/747,166

(22) Filed: Jan. 20, 2020

(65) Prior Publication Data

US 2020/0150519 A1     May 14, 2020

Related U.S. Application Data

(63) Continuation of application No. 16/550,573, filed on Aug. 26, 2019, now Pat. No. 10,539,861, which is a continuation-in-part of application No. 16/298,239, filed on Mar. 11, 2019, now Pat. No. 10,394,111, which is a continuation-in-part of application No.
(Continued)

(51) Int. Cl.
| | |
|---|---|
| *F21S 4/00* | (2016.01) |
| *F21V 21/00* | (2006.01) |
| *G03B 21/20* | (2006.01) |
| *F21V 23/06* | (2006.01) |
| *F21V 23/02* | (2006.01) |
| *F21V 17/12* | (2006.01) |
| *F21K 9/235* | (2016.01) |
| *F21V 29/71* | (2015.01) |
| *F21V 29/67* | (2015.01) |

(Continued)

(52) U.S. Cl.
CPC .......... *G03B 21/2033* (2013.01); *F21K 9/235* (2016.08); *F21V 17/06* (2013.01); *F21V 17/12* (2013.01); *F21V 23/02* (2013.01); *F21V 23/06* (2013.01); *F21V 29/67* (2015.01); *F21V 29/713* (2015.01); *G03B 21/16* (2013.01); *G03B 21/208* (2013.01)

(58) Field of Classification Search
CPC . F21K 9/23; F21K 9/235; F21V 17/04; F21V 17/06; F21V 17/12; F21V 23/02; F21V 23/06; F21V 29/67; F21V 29/70; F21V 29/71; F21V 29/713
USPC .......... 362/249.02–249.05, 294, 311.02, 373, 362/800
See application file for complete search history.

(56) References Cited

U.S. PATENT DOCUMENTS

2007/0030454 A1* 2/2007 Richards ................ G03B 21/20
352/242

* cited by examiner

*Primary Examiner* — Jason M Han
(74) *Attorney, Agent, or Firm* — Ascentage Patent Law, PLLC; Travis Lee Johnson; Craig Alan Hallacher

(57) ABSTRACT

In one aspect, a light assembly configured to be installed in a movie theatre projector includes an emitter housing with an LED emitter plate that emits a beam of light and a lens assembly. The light assembly also includes a cooling assembly configured to dissipate heat from the LED emitter plate. The a cooling assembly includes a cooling fluid jacket coupled to the LED emitter plate, where the cooling fluid jacket comprises a metal layer enclosing a hollow path for cooling fluid, and where the cooling fluid jacket is configured to allow the cooling fluid to pass through cooling fluid jacket, thereby drawing heat from the LED emitter plate. The light assembly also includes a heat sink and a cooling fan. The cooling assembly further includes cooling sections to cool the cooling fluid that flows out of the cooling fluid jacket.

3 Claims, 19 Drawing Sheets

Related U.S. Application Data

16/130,305, filed on Sep. 13, 2018, now Pat. No. 10,228,612, which is a continuation-in-part of application No. 15/941,583, filed on Mar. 30, 2018, now Pat. No. 10,088,741, which is a continuation-in-part of application No. 15/467,712, filed on Mar. 23, 2017, now Pat. No. 9,952,490.

(60) Provisional application No. 62/312,101, filed on Mar. 23, 2016.

(51) Int. Cl.
*G03B 21/16* (2006.01)
*F21V 17/06* (2006.01)

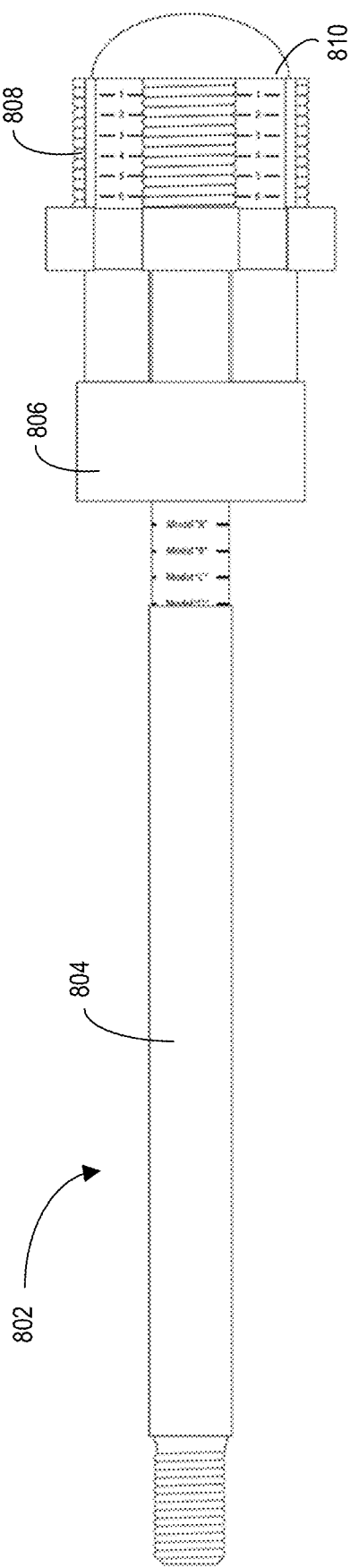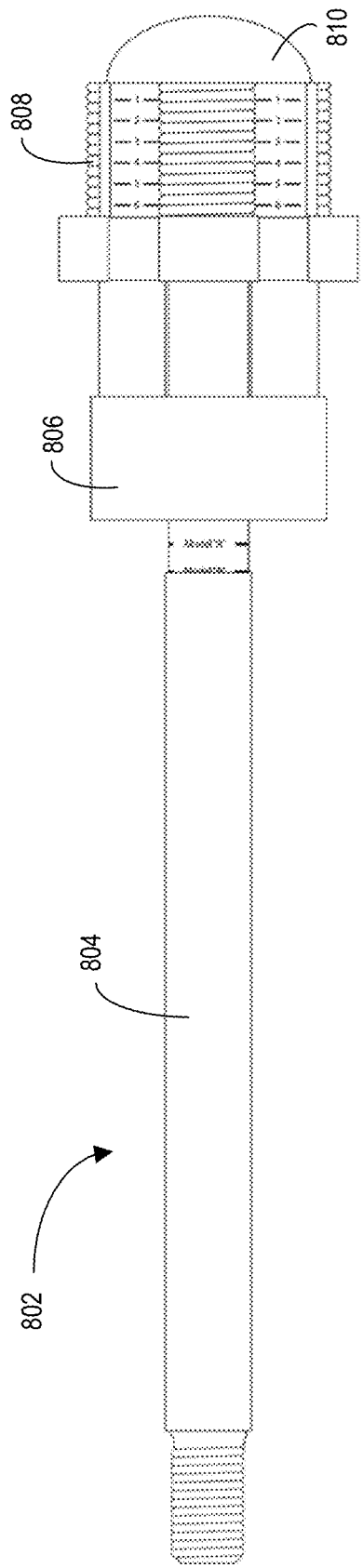
FIG. 9A
FIG. 9B

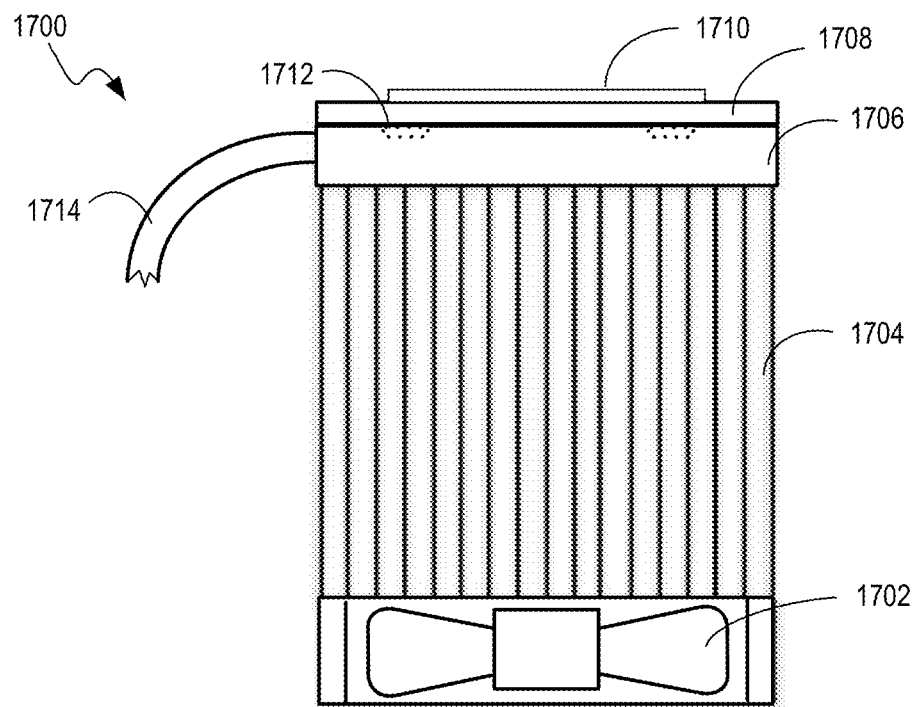
FIG. 17A
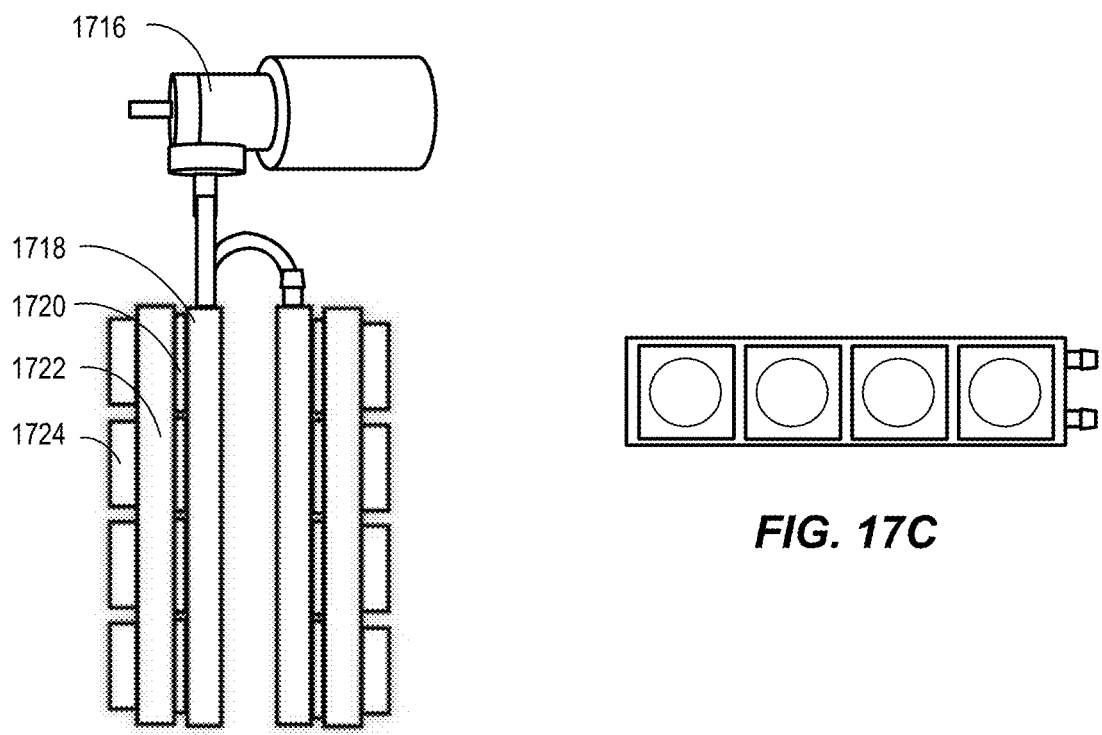
FIG. 17B
FIG. 17C

LIGHT ASSEMBLY FOR A PROJECTOR

RELATED APPLICATIONS

This application is a continuation of U.S. application Ser. No. 16/550,573, filed Aug. 26, 2019, which is a continuation-in-part of U.S. application Ser. No. 16/298,239, filed Mar. 11, 2019, which is a continuation-in-part of U.S. application Ser. No. 16/130,305, filed Sep. 13, 2018, now U.S. Pat. No. 10,228,612, which is a continuation-in-part of U.S. application Ser. No. 15/941,583, filed Mar. 30, 2018, now U.S. Pat. No. 10,088,741, which is a continuation-in-part of U.S. application Ser. No. 15/467,712, filed Mar. 23, 2017, now U.S. Pat. No. 9,952,490, which claims priority from U.S. Provisional Appl. No. 62/312,101, filed Mar. 23, 2016, the contents of which are incorporated herein in their entireties.

TECHNICAL FIELD

The present disclosure generally relates to lighting fixtures for projectors. More specifically, the present disclosure relates to lighting assemblies incorporating light-emitting diodes (LEDs) configured to retrofit to lighting fixtures previously incorporating incandescent lamps.

BACKGROUND

Theatre, architectural and television projectors project high-intensity beams of light. Currently, two primary types of basic projectors are Analog Film Projectors and Digital Projectors. Both types of projectors utilize very high quality incandescent or High-Intensity Discharge (HID) bulbs to create very intense light to illuminate the film or digital display and focus this display at a distance onto a movie screen.

However, these bulbs are very expensive and have a relatively short lifespan. Currently, many projectors use a Xenon-Plasma HID bulb rated at 3,000-5,000 watts to produce between 20,000 to 34,000 lumens (6-7 LPW). The average lifetime for these types of bulbs is from 6 to 16 weeks. This increases the cost of operation. These types of bulbs also produce an excess amount of heat. Therefore, a high-performance cooling fan and sometimes a secondary roof mounted ventilation fan system is utilized to cool the projector. Further, the projection room requires auxiliary air conditioning to keep temperatures at an acceptable level.

Moreover, plasma HID bulbs contain hazardous material, such as mercury. These bulbs are prone to explode. When they explode, they also damage the projector. In fact, they are so volatile that they are shipped and stored in explosion-proof containment units to prevent bodily harm.

Accordingly, there is a need for an efficient, effective and safe alternative to the bulbs currently used in projectors.

SUMMARY

Embodiments of the present invention provide a light assembly configured to be installed in a high-lumen, high-wattage movie theatre projector.

According to some embodiments, a light assembly configured to be installed in a movie theatre projector includes an adaptor configured to mechanically couple to a bulb mount of the movie theatre projector and an emitter housing that comprises an LED emitter plate. At least one LED is directly or indirectly attached to the LED emitter plate and configured to emit a beam of light. The lighting assembly includes a cooling assembly configured to dissipate heat from the LED emitter plate and a lens assembly configured to adjust the size or pitch of the beam. The lens assembly includes a concave adjustor with a concave lens configured to spread the beam emitted from the at least one LED and a convex adjustor with a convex lens configured to collimate light received from the concave lens. The concave adjustor is movably attached to the emitter housing and the convex adjustor, and the lens assembly is configured to be manipulated to adjust a distance between the concave lens and the convex lens, thereby adjusting the size or pitch of the beam. The beam may be a quadrilateral-like shape, such as a square.

According to some embodiments, a lens assembly is configured to be movably attached to an LED emitter that includes at least one LED. The lens assembly includes a concave adjustor with a concave lens configured to spread a beam of light emitted from the at least one LED and a convex adjustor with a convex lens configured to collimate light received from the concave lens. The concave adjustor is movably attached to the LED emitter and the convex adjustor, and the lens assembly is configured to be manipulated to adjust a distance between the concave lens and the convex lens, thereby adjusting the size or pitch of the beam.

According to some embodiments, a light assembly configured to be installed in a movie theatre projector includes an adaptor configured to mechanically couple to a bulb mount of the movie theatre projector and an LED emitter comprising at least one LED configured to emit a beam of light. The light assembly also includes a lens assembly configured to adjust a distance between a concave lens and a convex lens through which the beam passes. The concave adjustor is movably attached to the LED emitter and the convex adjustor. The lens assembly is configured to be manipulated to adjust a distance between the concave lens and the convex lens.

According to some embodiments, a light assembly system configured to be installed in a movie theatre projector includes a light assembly, which includes an adaptor configured to mechanically couple to a bulb mount of the movie theatre projector, a primary LED Emitter mounting plate, at least one LED directly or indirectly attached to the primary LED Emitter mounting plate, a cooling assembly configured to dissipate heat from the primary LED Emitter mounting plate and a lens configured to collimate light emitted from the at least one LED. The light assembly system also includes a light assembly control system, separate from an existing control system of the movie theatre projector, that is configured to control operation of the light assembly.

The light assembly control system may be a standalone system external to the light assembly and comprises a driver to power the at least one LED. The light assembly control system may be configured to interface with the existing control system of the movie theater projector with regard to when the light assembly is to operate.

According to some embodiments, a light assembly system configured to be installed in a movie theatre projector includes a light assembly, which includes an adaptor configured to mechanically couple to a bulb mount of the movie theatre projector, a primary LED Emitter mounting plate, at least one LED directly or indirectly attached to the primary LED Emitter mounting plate, a cooling assembly configured to dissipate heat from the primary LED Emitter mounting plate and a lens configured to collimate light emitted from the at least one LED. The light assembly system includes a light assembly control system configured to control operation of the light assembly and the movie theatre projector.

According to some embodiments, a light assembly in a movie theatre projector includes an adaptor configured to mechanically couple to a bulb mount of the movie theatre projector, at least one LED attached to a primary LED Emitter mounting plate, a cooling assembly configured to dissipate heat from the primary LED Emitter mounting plate, and a lens configured to collimate light emitted from the at least one LED. A method for installation of the light assembly includes placing the light assembly control system in or proximate to the movie theatre projector, where the light assembly control system is separate from an existing control system of the movie theatre projector and configured to control operation of the light assembly. The method also includes inserting the light assembly into the movie theatre projector by mechanically coupling the adaptor to the bulb mount and electrically coupling the light assembly to the light assembly control system. The method further includes establishing a communication link between the light assembly control system and the existing control system of the movie theatre projector.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow across the heat sink. The light assembly further includes a lens mounting plate and a lens configured to collimate light emitted from the at least one LED, where the lens is disposed over the lens mounting plate. The light assembly includes an attachment assembly configured to attach the lens mounting plate to the primary LED Emitter mounting plate.

The attachment assembly may include a plurality of lens mount standoffs that attach the lens mounting plate to the primary LED Emitter mounting plate so as to maintain a predetermined distance between the at least one LED and the lens. In other embodiments, the attachment assembly may be configured to be manipulated to adjust a distance between the at least one LED and the lens.

According to some embodiments, a light assembly configured to be installed in a movie theatre projector includes an adaptor configured to mechanically couple to a bulb mount of the movie theatre projector at a first end of the adaptor, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow past the heat sink. The adaptor includes an elongated portion extending from the first end of the adaptor towards the primary LED Emitter mounting plate, where the adaptor is configured to be manipulated to adjust a length of the elongated portion so as to adjust a location of the primary LED Emitter mounting plate in relation to a projector lens aperture.

According to some embodiments, a light assembly is configured to be installed in a movie theatre projector, the light assembly includes an adaptor configured to mechanically couple to a bulb mount of the movie theatre projector, a primary LED Emitter mounting plate and at least one LED directly or indirectly attached to the primary LED Emitter mounting plate. The light assembly also includes a cooling assembly configured to dissipate heat from the primary LED Emitter mounting plate and a lens configured to collimate light emitted from the at least one LED. The cooling assembly may include a heat sink configured to dissipate heat from the primary LED Emitter mounting plate, a cooling fan configured to generate airflow past the heat sink and/or one or more thermal pads in contact with the primary LED Emitter mounting plate.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly also includes a heat sink configured to dissipate heat from the primary LED Emitter mounting plate, a cooling fan configured to generate airflow across the heat sink, a lens mounting plate and a lens configured to collimate light emitted from the at least one LED, where the lens is disposed over the lens mounting plate. The light assembly further includes an attachment assembly configured to attach the lens mounting plate to the primary LED Emitter mounting plate.

The attachment assembly may include a plurality of lens mount standoffs that attach the lens mounting plate to the primary LED Emitter mounting plate so as to maintain a predetermined distance between the at least one LED and the lens. The attachment assembly may be configured to be manipulated to adjust a distance between the at least one LED and the lens. For example, the attachment assembly may be configured to adjust the distance between the at least one LED and the lens in response to a rotation of the attachment assembly or a portion of the attachment assembly.

According to some embodiments, a light assembly configured to be installed in a movie theatre projector includes an adaptor configured to mechanically couple to a bulb mount of the movie theatre projector at a first end of the adaptor, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow past the heat sink. The adaptor includes an elongated portion extending from the first end of the adaptor towards the primary LED Emitter mounting plate, where the adaptor is configured to be manipulated to adjust a length of the elongated portion so as to adjust a location of the primary LED Emitter mounting plate in relation to a projector lens aperture. The adaptor may be configured to adjust the length of the elongated portion in response to a rotation of the adaptor or the elongated portion.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly may include a cooling assembly configured to dissipate heat from the primary LED Emitter mounting plate and a lens configured to collimate light emitted from the at least one LED. The cooling assembly may include a heat sink configured to dissipate heat from the primary LED Emitter mounting plate, a cooling fan configured to generate airflow past the heat sink and/or one or more thermal pads in contact with the primary LED Emitter mounting plate.

In one embodiment, the light assembly includes an adaptor configured to mechanically couple with a bulb mount of the movie theatre projector. The light assembly further includes a female socket rigidly connected to the adaptor and a male socket configured to mate with the female socket. Moreover, the light assembly includes one more cooling fans configured to generate airflow, where the one more cooling fans are attachable to the male socket using a first attaching means. Yet further, the light assembly includes a heat sink configured to dissipate heat, where the heat sink is attachable to the one more cooling fans using the first attaching means; a first thermal transfer pad configured to conduct heat, where the first thermal transfer pad is attachable to the heat sink using a second attaching means; a primary mounting plate configured to be attached to the first thermal transfer pad using the second attaching means; and a second thermal transfer pad configured to conduct heat, where the second thermal transfer pad is attachable to the primary mounting plate using the second attaching means. Moreover, the light assembly includes a board configured to be attached to the second thermal transfer pad using the second attaching means, where an LED Array is configured to generate light, where the LED Array is mounted on the board. Technologies such as Surface-Mounted Device (SMD) and Chip on Board (COB) may be used for the LED Array. Further, the light assembly includes a lens mounting plate configured to be attached to the primary mounting plate using a third attaching means, where the lens mounting plate is transparent to the light emitted by the LED Array; multiple lens mount standoffs configured to maintain a predetermined distance between the lens mounting plate and the primary mounting plate when the lens mounting plate is attached to the primary mounting plate; a lens configured to collimate light emitted from the LED Array, where the lens is disposed over the lens mounting plate; and a lens retainer configured to be attached to the lens mounting plate using a fourth attaching means, where attaching the lens retainer to the lens mounting plate secures a placement of the lens on the lens mounting plate.

In another embodiment of a light assembly configured to be installed in a movie theatre projector, the light assembly includes an adaptor configured to mechanically couple with a bulb mount of the movie theatre projector. The light assembly further includes one or more cooling fans configured to generate airflow, where the one or more cooling fans are attachable to the adaptor using a first attaching means. Further, the light assembly includes a heat sink configured to dissipate heat, where the heat sink is attachable to the one more cooling fans using the first attaching means. The light assembly also includes a first thermal transfer pad configured to conduct heat, where the first thermal transfer pad is attachable to the heat sink using a second attaching means. The light assembly further includes a primary mounting plate configured to be attached to the first thermal transfer pad using the second attaching means. Further, a second thermal transfer pad configured to conduct heat, where the second thermal transfer pad is attachable to the primary mounting plate using the second attaching means. Yet further, a board is configured to be attached to the second thermal transfer pad using the second attaching means. Multiple LEDs are configured to generate light, where the LED Array is mounted on the board. Moreover, a lens mounting plate is configured to be attached to the primary mounting plate using a third attaching means, where the lens mounting plate is transparent to the light emitted by the LED Array. The light assembly further includes multiple lens mount standoffs configured to maintain a predetermined distance between the lens mounting plate and the primary mounting plate when the lens mounting plate is attached to the primary mounting plate. Moreover, a lens is configured to collimate light emitted from the LED Array, where the lens is disposed over the lens mounting plate. Yet further, a lens retainer is configured to be attached to the lens mounting plate using a fourth attaching means, wherein attaching the lens retainer to the lens mounting plate secures a placement of the lens on the lens mounting plate.

In another embodiment of a light assembly configured to be installed in a movie theatre projector, the light assembly includes an adaptor configured to mechanically couple with a bulb mount of the movie theatre projector. Further, the light assembly includes one or more cooling fans configured to generate airflow, where the one or more cooling fans are attachable to the adaptor using a first attaching means. Moreover, the light assembly includes a heat sink configured to dissipate heat, where the heat sink is attachable to the one or more cooling fans using the first attaching means. Further, the light assembly includes a first thermal transfer pad configured to conduct heat, where the first thermal transfer pad is attachable to the heat sink using a second attaching means. Yet further, the light assembly includes a primary mounting plate configured to be attached to the first thermal transfer pad using the second attaching means. Moreover, the light assembly includes a second thermal transfer pad configured to conduct heat, where the second thermal transfer pad is attachable to the primary mounting plate using the second attaching means. Further, the light assembly includes a board configured to be attached to the second thermal transfer pad using the second attaching means. Yet further, the light assembly includes multiple LEDs configured to generate light, where the LED Array is mounted on the board. Moreover, the light assembly includes a shroud configured to collimate light generated by the multiple LEDs onto a projector lens comprised in the movie theatre projector, where the shroud is configured to be attached to the board.

Embodiments of the light assembly have a longer lifespan, which reduces the cost of operation and makes the operation safer. Further, the LEDs contain no harmful materials and they pose no explosion hazard. Moreover, with the introduction of LED industrial lighting, there is an opportunity to utilize this ever-progressing technology for more and more lighting opportunities. Until recently, an endeavor such as this was not possible due to the intense amount of illumination required to "throw" the images of a theater projector for such a long distance. With the advent of new Chips on Board (COB) array emitters and Surface Mount Device (SMD) arrays with unprecedented efficiencies, it is now possible to create and maintain these high light outputs necessary for such utilization.

According to some embodiments, a light assembly configured to be installed in a movie theatre projector includes an adaptor configured to mechanically couple to a bulb mount of the movie theatre projector, an emitter housing that comprises an LED emitter plate, at least one LED directly or indirectly attached to the LED emitter plate and configured to emit a beam of light, and a lens assembly configured to collimate light emitted from the at least one LED. The light assembly also includes a cooling assembly configured to dissipate heat from the LED emitter plate, where the cooling assembly comprises a first cooling fluid jacket coupled to the LED emitter plate, where the first cooling fluid jacket comprises a metal layer enclosing a hollow path for cooling fluid, and where the first cooling fluid jacket is configured to allow the cooling fluid to pass into the first cooling fluid jacket, along the path and out of the first cooling fluid jacket, thereby drawing heat from the LED emitter plate. The cooling assembly also includes a first heat sink coupled to the first cooling fluid jacket and a first cooling fan configured to pass air over the first heat sink. The cooling assembly may also include cooling sections that receive and cool the heated cooling fluid.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations, and improvements herein shown and described in various exemplary embodiments.

BRIEF DESCRIPTION OF THE DRAWINGS

FIGS. 9A-9B show a perspective views of a light assembly retrofitted in a movie theatre projector with an adjustable adaptor, in accordance with some embodiments.

FIGS. 17A-17C illustrate a cooling assembly, according to some embodiments.

DETAILED DESCRIPTION

Figure 1:
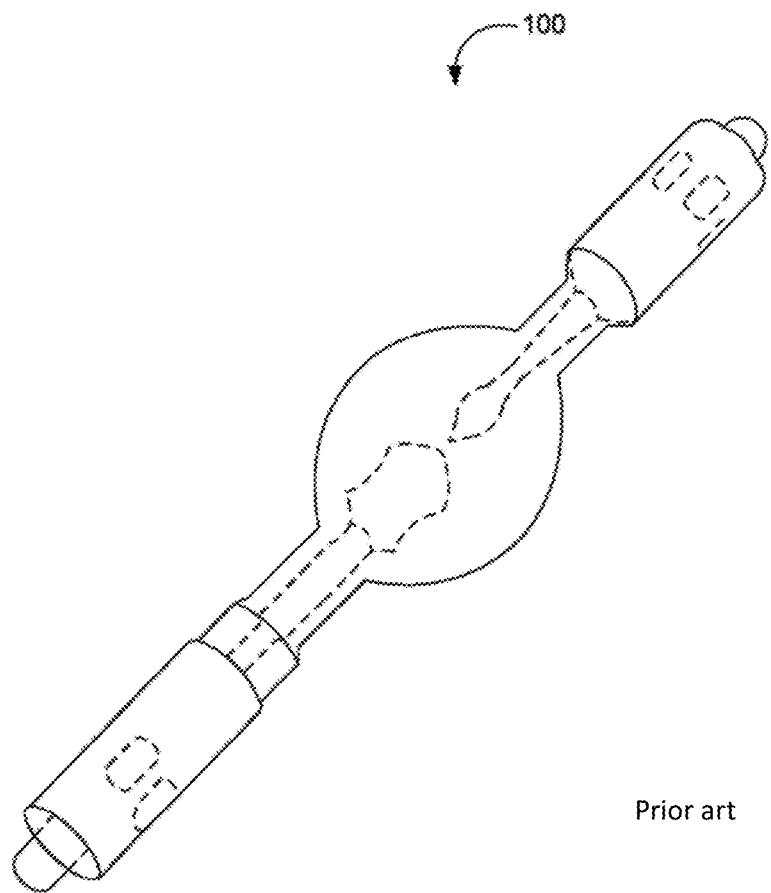
FIG. 1 shows a perspective view of a projector bulb in a light assembly used in theatres, according to prior art.

All descriptions are for the purpose of showing selected versions of the present invention and are not intended to limit the scope of the present invention. Non-limiting and non-exhaustive embodiments of the present invention are described with reference to the preceding figures, wherein like reference numerals refer to like parts throughout the various views unless otherwise precisely specified.

The present disclosure relates to a light assembly configured to be installed in a movie theatre projector. The light assembly is configured to replace one or both of an arc discharge lamp and an incandescent lamp. The light assembly includes an adaptor configured to mechanically couple with a bulb mount of the movie theatre projector. The adaptor may include a cylindrical extension, where an external surface of the cylindrical extension includes screw threading configured to mate with a complimentary screw threading comprised in an internal surface of the bulb mount. Further, the adaptor may be configured to receive electrical power from the bulb mount when the adaptor is mechanically coupled to the bulb mount. The bulb mount may correspond to one of an anode and a cathode.

The light assembly further includes a female socket rigidly connected to the adaptor and a male socket configured to mate with the female socket. Moreover, the light assembly includes one or more cooling fans configured to generate airflow, where the cooling fans are attachable to the male socket using a first attaching means. The cooling fans may include multiple cooling fans configured to be attached to each other or on other areas of the light assembly heat sink using the first attaching means.

Each of the multiple cooling fans may be configured to be simultaneously operational. Further, one or more of the multiple cooling fans may be configured to be activated based on failure of one or more other cooling fans of the multiple cooling fans. Accordingly, the light assembly may include a failure indicator device configured to indicate failure of a cooling fan. Yet further, the light assembly includes a heat sink configured to dissipate heat, where the heat sink is attachable to the one or more cooling fans using the first attaching means; a first thermal transfer pad configured to conduct heat, where the first thermal transfer pad is attachable to the heat sink using a second attaching means; a primary mounting plate configured to be attached to the first thermal transfer pad using the second attaching means; and a second thermal transfer pad configured to conduct heat, where the second thermal transfer pad is attachable to the primary mounting plate using the second attaching means. The light assembly may also include a socket adaptor plate disposed between the male socket and the heat sink, where the socket adaptor plate may be configured to be attached to each of the male socket and the heat sink using the first attaching means. Further, the light assembly may include multiple spacers disposed between the socket adaptor plate and the heat sink, where the multiple spacers may be configured to maintain a predetermined distance between the socket adaptor plate and the heat sink when the socket adaptor plate is attached to the heat sink using the first attaching means.

Moreover, the light assembly includes a board configured to be attached to the second thermal transfer pad using the second attaching means, where an LED Array is configured to generate light, where the LED Array is mounted on the board. The LED array comprises a plurality of LEDs. Technologies such as Surface-Mounted Device (SMD) and Chip on Board (COB) may be used for the LED Array and the board. The primary mounting plate with the LEDs may be considered to be a primary LED Emitter mounting plate.

Further, the light assembly includes a lens mounting plate configured to be attached to the primary mounting plate using a third attaching means, where the lens mounting plate is transparent to the light emitted by the LED Array. The light assembly may include multiple lens mount standoffs configured to maintain a predetermined distance between the lens mounting plate and the primary mounting plate when the lens mounting plate is attached to the primary mounting plate. These lens mount standoffs may be considered to be part of an attachment assembly. The light assembly may also include a lens configured to collimate light emitted from the LED Array, where the lens is disposed over the lens mounting plate, and a lens retainer configured to be attached to the lens mounting plate using a fourth attaching means, where attaching the lens retainer to the lens mounting plate secures a placement of the lens on the lens mounting plate.

According to further aspects, the light assembly may include an AC-DC converter configured to convert alternating current to direct current, where the AC-DC converter may be configured to provide power to the LED Array. Further, the AC-DC converter may include a power adjuster configured to adjust a power level supplied to the LED Array. Also, the AC-DC converter may be electrically connected to the adaptor, where the adaptor is configured to receive electrical power from the bulb mount. Moreover, the AC-DC converter is configured to be attached to the light assembly by using a fifth attaching means.

According to further aspects, the light assembly may include a shroud configured to collimate light generated by the LED Array onto a projector lens comprised in the movie theatre projector. Further, the light assembly may include an adjustment rod configured to adjust an alignment of the light assembly in relation to the projector lens, where a foot portion of the adjustment rod may be configured to be immovably mounted on a base of the movie theatre projector, wherein a head portion of the adjustment rod may be movably attachable to the shroud.

According to further aspects, the adaptor may be further configured to form a tight contact with an interior surface of a projector shroud comprised in the movie projector, where the tight contact directs air flow for cooling, where the light assembly may be configured to be disposed within an interior volume of the projector shroud.

According to some aspects, a light assembly configured to be installed in a movie projector is disclosed. The light assembly includes an adaptor configured to mechanically couple with a bulb mount of the movie theatre projector. The light assembly further includes one or more cooling fans configured to generate airflow, where the one or more cooling fans are attachable to the adaptor using a first attaching means. Further, the light assembly includes a heat sink configured to dissipate heat, where the heat sink is attachable to the one or more cooling fans using the first attaching means. The light assembly also includes a first thermal transfer pad configured to conduct heat, where the first thermal transfer pad is attachable to the heat sink using a second attaching means. The light assembly further includes a primary mounting plate configured to be attached to the first thermal transfer pad using the second attaching means. Further, a second thermal transfer pad is configured to conduct heat, where the second thermal transfer pad is attachable to the primary mounting plate using the second attaching means. Yet further, a board is configured to be attached to the second thermal transfer pad using the second attaching means. Multiple LEDs are configured to generate light, where the LED Array is mounted on the board. Moreover, a lens mounting plate is configured to be attached to the primary mounting plate using a third attaching means, where the lens mounting plate is transparent to the light emitted by the LED Array. The light assembly further includes multiple lens mount standoffs configured to maintain a predetermined distance between the lens mounting plate and the primary mounting plate when the lens mounting plate is attached to the primary mounting plate. Moreover, a lens is configured to collimate light emitted from the LED Array, where the lens is disposed over the lens mounting plate. Yet further, a lens retainer is configured to be attached to the lens mounting plate using a fourth attaching means, where attaching the lens retainer to the lens mounting plate secures a placement of the lens on the lens mounting plate.

According to some aspects, a light assembly configured to be installed in a movie theatre projector includes an adaptor configured to mechanically couple with a bulb mount of the movie projector. Further, the light assembly includes one or more cooling fans configured to generate airflow, where the one or more cooling fans are attachable to the adaptor using a first attaching means. Moreover, the light assembly includes a heat sink configured to dissipate heat, where the heat sink is attachable to the one or more cooling fans using the first attaching means. Further, the light assembly includes a first thermal transfer pad configured to conduct heat, where the first thermal transfer pad is attachable to the heat sink using a second attaching means. Yet further, the light assembly includes a primary mounting plate configured to be attached to the first thermal transfer pad using the second attaching means. Moreover, the light assembly includes a second thermal transfer pad configured to conduct heat, where the second thermal transfer pad is attachable to the primary mounting plate using the second attaching means. Further, the light assembly includes a board configured to be attached to the second thermal transfer pad using the second attaching means. Yet further, the light assembly includes an LED Array configured to generate light, where the LED Array is mounted on the board. Moreover, the light assembly includes a shroud configured to collimate light generated by the LED Array onto a projector lens comprised in the movie theatre projector, where the shroud is configured to be attached to the board.

Referring now to the figures, FIG. 1 shows a projector bulb 100 in a projector used in theatres, according to prior art. The projector bulb 100 may include, but is not limited to, High Intensity Discharge (HID) lamp, Xenon lamp, halogen lamp, mercury short-arc lamp, and metal halide lamp.

Figure 2:
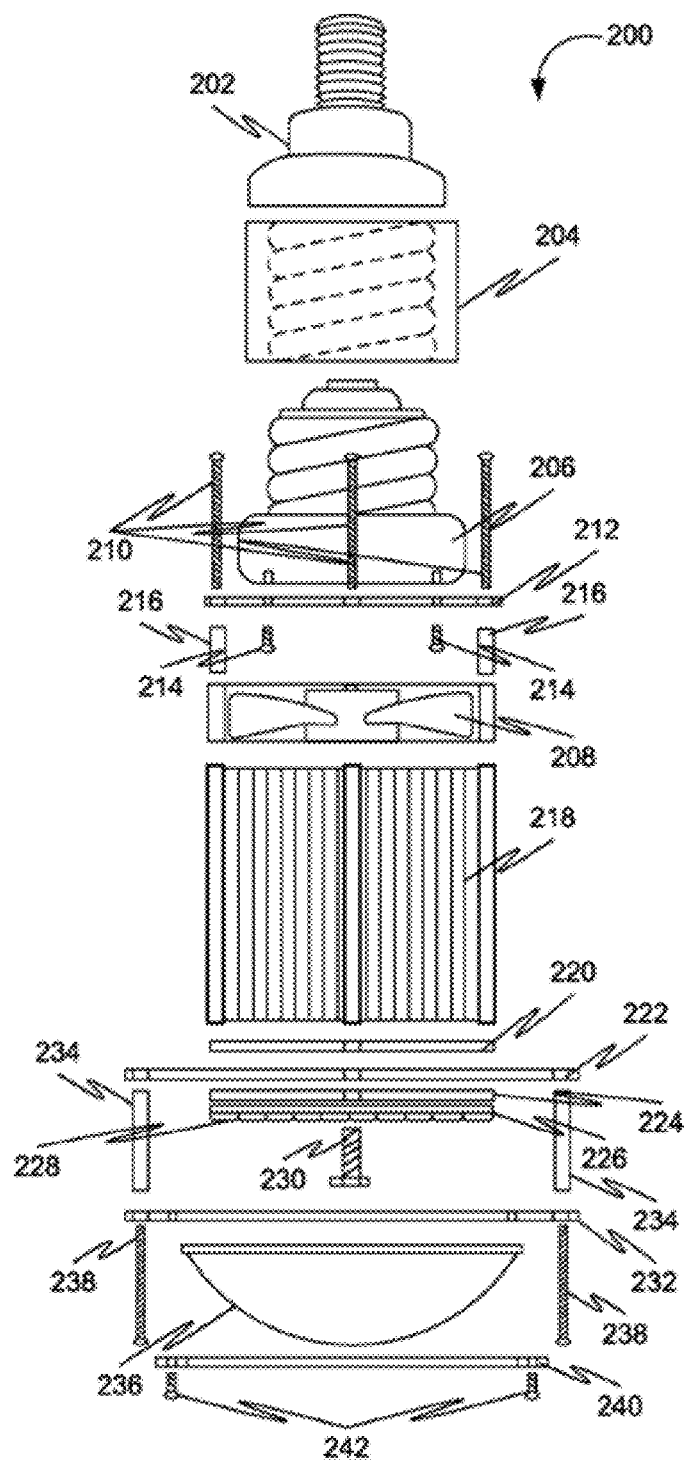
FIG. 2 shows an exploded view of a light assembly configured to be installed in a movie theatre projector, in accordance with various embodiments disclosed herein.
Figure 3:
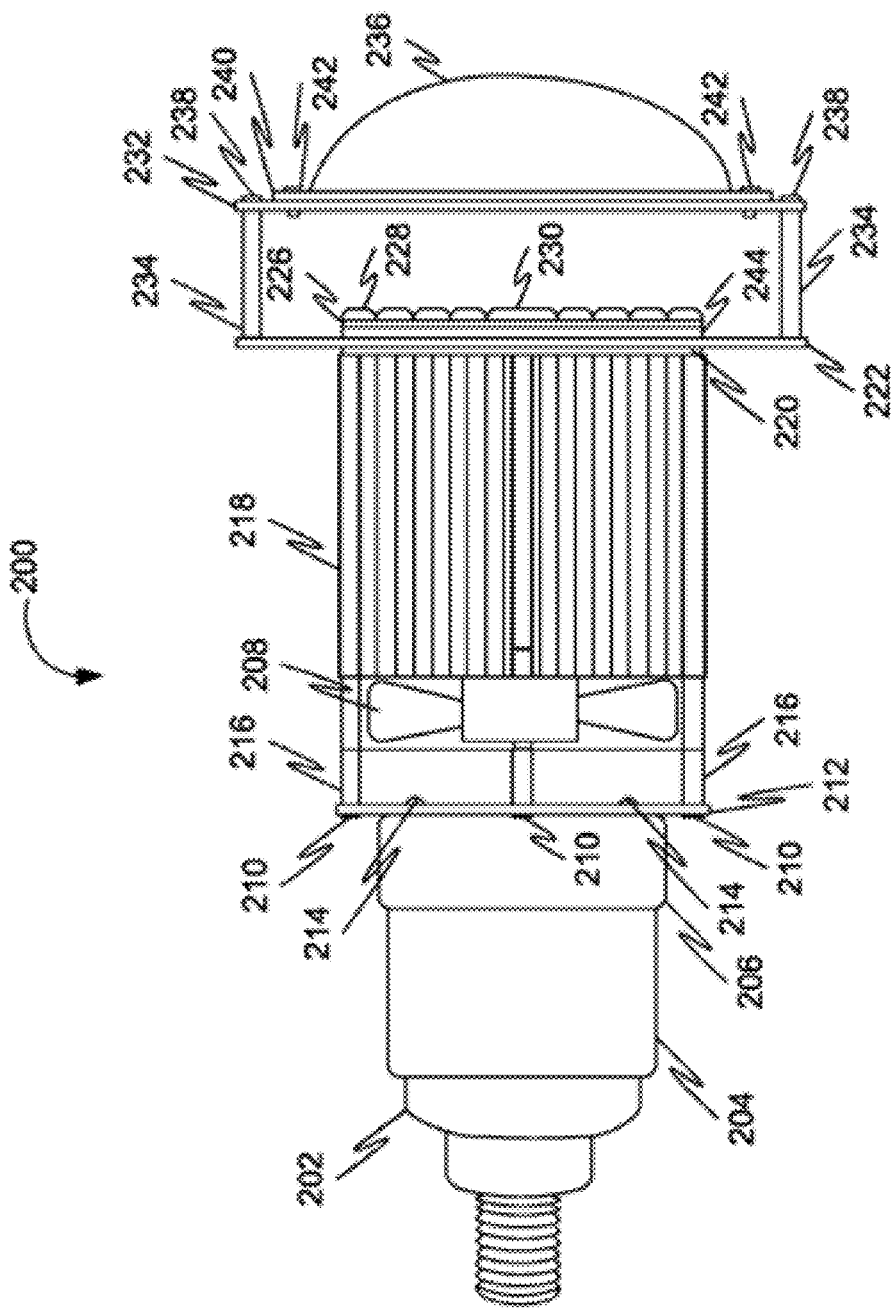
FIG. 3 shows a cross-section view of the light assembly of FIG. 2 after assembly.
Figure 4:
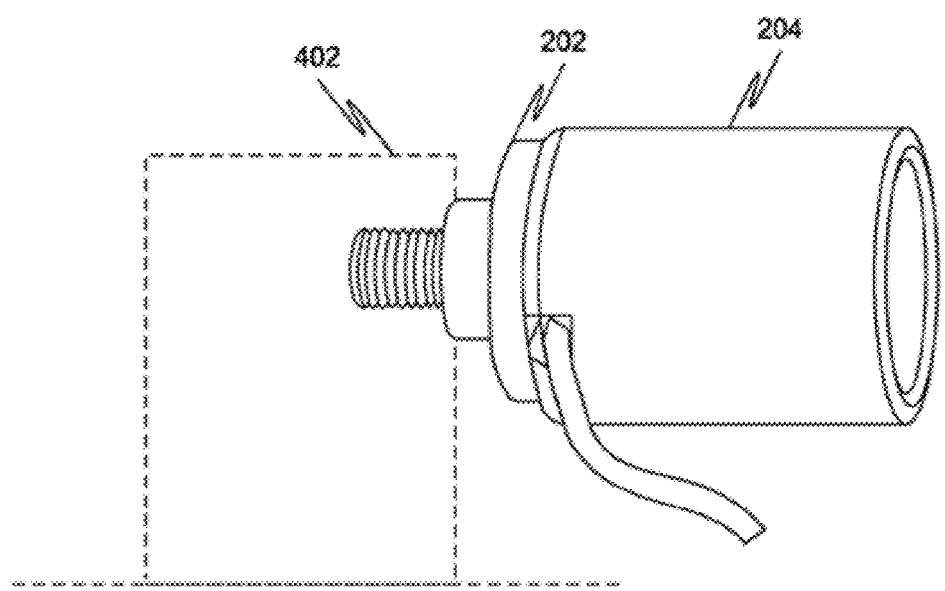
FIG. 4 shows a perspective view of one end of the light assembly of FIG. 2 installed in a movie theatre projector.

FIG. 2 shows an exploded view of a light assembly 200 configured to be installed in a movie theatre projector, in accordance with various embodiments disclosed herein. FIG. 3 shows a cross-section view of the light assembly 200 of FIG. 2, after assembly. FIG. 4 shows a perspective view of one end of the light assembly 200 of FIG. 2 installed in a movie theatre projector. The light assembly 200 may be configured to replace the projector bulb 100, which may be an arc discharge lamp and/or an incandescent lamp. The light assembly 200 may include an adaptor 202 configured to mechanically couple with a bulb mount 402 of the movie theatre projector. The adaptor 202 may include a cylindrical extension, where an external surface of the cylindrical extension may include screw threading configured to mate with a complimentary screw threading comprised in an internal surface of the bulb mount 402. Further, the light assembly 200 may include a female socket 204 rigidly connected to the adaptor 202. The light assembly 200 may also include a male socket 206 configured to mate with the female socket 204. Yet further, the light assembly 200 may include one or more cooling fans 208 configured to generate airflow. The one or more cooling fans 208 may be attachable to the male socket 206 using a first attaching means. For example, the first attaching means may include multiple fan mounting screws 210, a socket adaptor plate 212, socket mounting screws 214 and multiple spacers 216.

Moreover, the light assembly 200 may include a heat sink 218 configured to dissipate heat. The socket adaptor plate 212 may be disposed between the male socket 206 and the heat sink 218, where the socket adaptor plate 212 may be configured to be attached to each of the male socket 206 and the heat sink 218 using the first attaching means. The multiple spacers 216 may be disposed between the socket adaptor plate 212 and the heat sink 218, where the multiple spacers 216 may be configured to maintain a predetermined distance between the socket adaptor plate 212 and the heat sink 218 when the socket adaptor plate 212 may be attached to the heat sink 218 using the first attaching means.

Further, the heat sink 218 may be attachable to the one or more cooling fans 208 using the first attaching means. Further, the one or more cooling fans 208 may include multiple cooling fans configured to be attached to each other using the first attaching means. Each of the one or more cooling fans 208 may be configured to be simultaneously operational. Further, one or more cooling fans in the one or more cooling fans 208 may be configured to be activated based on failure of one or more other cooling fans in the one or more cooling fans 208. Accordingly, the light assembly 200 may also include a failure indicator device configured to indicate failure of a cooling fan in the one or more cooling fans 208.

Further, the light assembly 200 may include a first thermal transfer pad 220 configured to conduct heat. The first thermal transfer pad 220 may be attachable to the heat sink 218 using a second attaching means. Yet further, the light assembly 200 may include a primary mounting plate 222 configured to be attached to the first thermal transfer pad 220 using the second attaching means. The light assembly 200 may include a second thermal transfer pad 224 configured to conduct heat. The second thermal transfer pad 224 may be attachable to the primary mounting plate 222 using the second attaching means.

Further, the light assembly 200 may include a board 226 configured to be attached to the second thermal transfer pad 224 using the second attaching means. A Light Emitting Diode (LED) Array 228 may be mounted on the board 226. The LED Array 228 may be configured to generate light and is composed of a multitude of individual LEDs. For example, the second attaching means may include a threaded lamp secure screw 230. Any combination of the heat sink, cooling fan(s), thermal transfer pads, and the first and second attaching means may be considered to be part of a cooling assembly.

In addition, the light assembly 200 may include a lens mounting plate 232 configured to be attached to the primary mounting plate 222 using a third attaching means. The lens mounting plate 232 may be transparent to the light emitted by the LED Array 228. Multiple lens mount standoffs 234 may be configured to maintain a predetermined distance between the lens mounting plate 232 and the primary mounting plate 222 when the lens mounting plate 232 is attached to the primary mounting plate 222. Further, a lens 236 may be disposed over the lens mounting plate 232. The lens 236 may be configured to collimate light emitted from the LED Array 228. For example, the third attaching means may include one or more of the multiple lens mount standoffs 234 and multiple lens mounting screws 238. The third attaching means may be considered to be or considered to be part of an attachment assembly.

Further, a lens retainer 240 may be attached to the lens mounting plate 232. The lens retainer 240 may secure a placement of the lens 236 on the lens mounting plate 232. The lens retainer 240 may be configured to be attached to the lens mounting plate 232 using a fourth attaching means. For example, the fourth attaching means may include lens retaining screws 242.

In some embodiments, the adaptor 202 may be configured to receive electrical power from the bulb mount 402 when the adaptor is mechanically coupled to the bulb mount 402. Accordingly, in an embodiment, the power available at the bulb mount 402 may be used to power the LED Array 228. Therefore, the light assembly 200 may include additional electrical circuitry, such as but not limited to, AC to DC converter connected to the bulb mount and the LED Array 228. In an alternative embodiment, the bulb mount 402 may function as a support for mounting the light assembly 200 while LED Array 228 may be powered either from a DC power source or the AC power source of the movie theatre projector tapped from another point. In other words, in an embodiment, the adaptor 202 may not be configured to establish an electrical connection with the bulb mount 402.

In some embodiments, the bulb mount 402 corresponds to an anode or a cathode. The conventional bulb (such as, the projector bulb 100 used in the movie theatre projector, such as an arc discharge lamp or an incandescent lamp includes two terminals that are configured to electrically connect with an anode terminal and a cathode terminal provided in the movie theatre projector. Further, the conventional projector bulb 100 is configured to be mechanically coupled to each of the anode terminal and the cathode terminal. However, the mechanism of mechanical coupling may differ between the anode terminal and the cathode terminal. In particular, the cathode terminal is configured to be coupled by a screw-based coupling mechanism while the anode terminal is configured to be coupled by a clip-based coupling mechanism. Accordingly, the light assembly 200 may be provided with the adaptor 202 configured to be mechanically coupled with either the anode terminal or the cathode terminal. Further, in some embodiments, the adaptor 202 may be configured to couple with both the anode terminal and the cathode terminal by means of a hybrid coupling mechanism comprised in the adaptor 202 that is configured to mechanically couple with both the anode terminal and the cathode terminal. However, in the case where the adaptor 202 is configured to be mechanically coupled with the anode, a spatial arrangement of the components of the light assembly 200 may be such that the adaptor 202 does not fall in the path of light exiting the lens 236.

In further embodiments, the light assembly 200 may include an AC-DC converter configured to convert alternating current to direct current, wherein the AC-DC converter is configured to provide power to the LED Array 228. According to currently available LED technology, it is preferable to provide only DC to power the LED Array 228.

However, in an embodiment, the LED Array 228 may be such that they may safely operate through their life span on AC as well. Accordingly, in an embodiment, the light assembly 200 may not include the AC-DC converter. Further, the LED Array 228 may further be configured to operate directly at the voltage levels generally provided at the bulb mount 402 of the movie projector, such as but not limited to, above 1 kV. Yet further, the AC-DC converter may include a power adjuster configured to adjust a power level supplied to the LED Array 228.

Moreover, the AC-DC converter may be electrically connected to the adaptor 202, where the adaptor 202 is configured to receive electrical power from the bulb mount 402. Accordingly, in an embodiment, although the adaptor 202 may receive electrical power from the bulb mount 402, the AC-DC converter may be situated external to the light assembly 200. Accordingly, the AC-DC converter may not be mechanically attached to the light assembly 200. Further, the AC-DC converter may be configured to be attached to the light assembly 200 by using a fifth attaching means. Accordingly, in an embodiment, the AC-DC converter may be disposed anywhere in the light assembly 200 and attached using one or more of the first attaching means, second attaching means, third attaching means, fourth attaching means and a fifth attaching means. For example, in an embodiment, the AC-DC converter may be disposed on the board 226 comprising the LED Array 228. Accordingly, the light assembly 200 may comprise an electrical path leading from the bulb mount 402 (i.e., one or more of the cathode terminal and the anode terminal of the movie theatre projector) to the AC-DC converter. In another example, the AC-DC converter may be mounted on a separate PCB board configured to be attached to any of the modular components of the light assembly 200. Accordingly, the light assembly 200 may further include electrical paths leading from the bulb mount 402 (i.e., one or more of the anode terminal and the cathode terminal) and to the LED Array 228.

In some embodiments, not all of the components shown in FIGS. 2 and 3 are used to form the light assembly. For example, a light assembly may include the adaptor 202 configured to mechanically couple to the bulb mount 402 of the movie theatre projector, the primary LED Emitter mounting plate 222 and at least one LED (e.g., LED array 228, SMD-type LED, COB-type LED, etc.) directly or indirectly attached to the primary LED Emitter mounting plate 222. The light assembly may also include a cooling assembly configured to dissipate heat from the primary LED Emitter mounting plate 222. The cooling assembly may include a heat sink configured to dissipate heat from the primary LED Emitter mounting plate, a cooling fan configured to generate airflow past the heat sink and/or one or more thermal pads in contact with the primary LED Emitter mounting plate, but not necessarily all of these. The light assembly may also include a lens 236 configured to collimate light emitted from the at least one LED. The lens 236 may be attached directly or indirectly to the primary LED emitter mounting plate 222.

Figure 5:
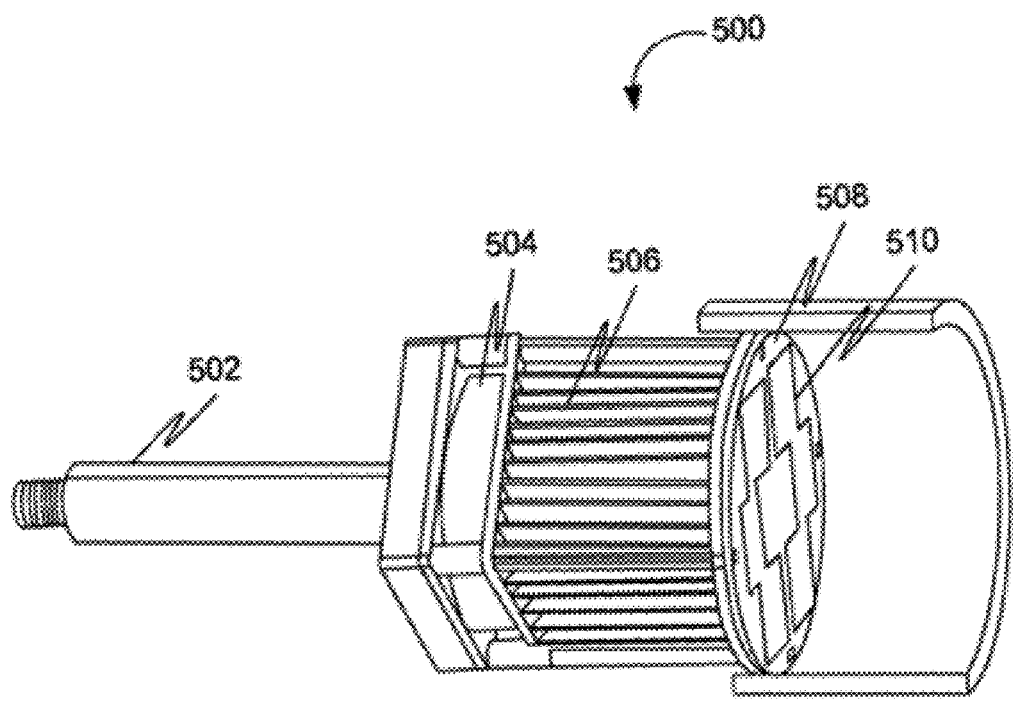
FIG. 5 shows a perspective view of a light assembly configured to be installed in a movie theatre projector, in accordance with some embodiments.
Figure 6:
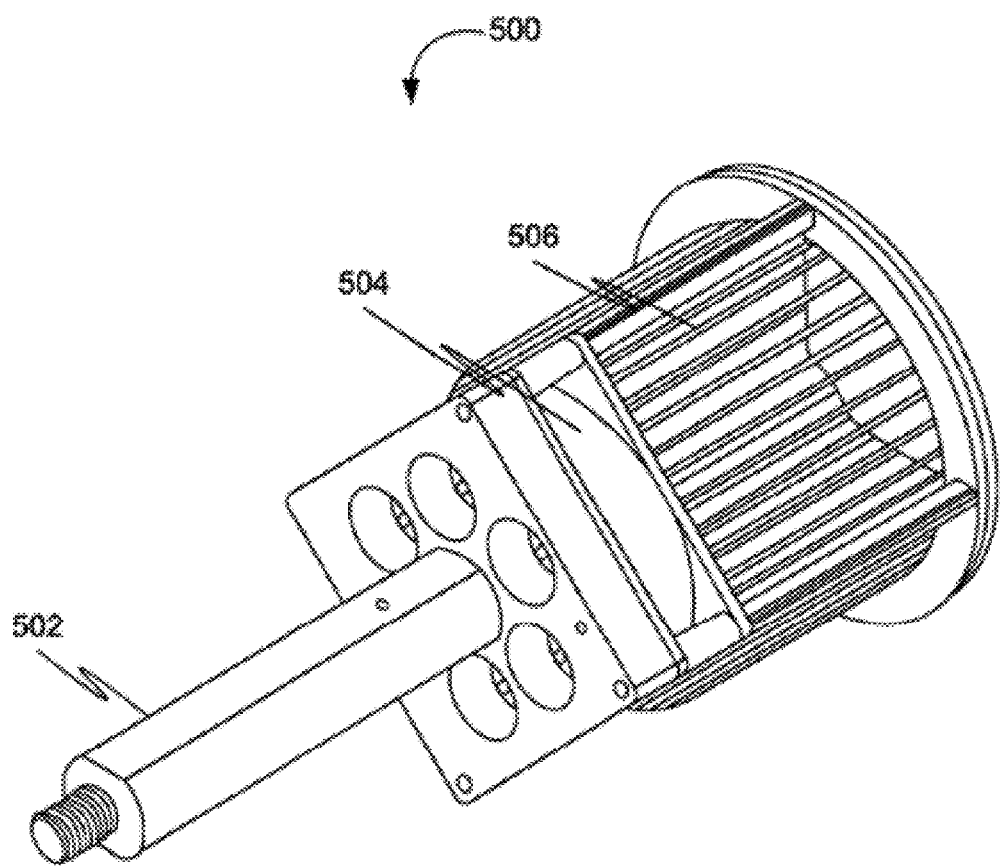
FIG. 6 shows a perspective view of the light assembly of FIG. 5.

FIG. 5 shows a perspective view of a light assembly 500 configured to be installed in movie theatre projector, in accordance with some embodiments. FIG. 6 shows another perspective view of the light assembly 500. The light assembly 500 may include an adaptor 502 configured to mechanically couple with a bulb mount 402 of the movie theatre projector. Further, the light assembly 500 may include one or more cooling fans 504 configured to generate airflow, where the one or more cooling fans 504 may be attachable to the adaptor 502 using a first attaching means.

Further, the light assembly 500 may include a heat sink 506 configured to dissipate heat, where the heat sink 506 is attachable to the one or more cooling fans 504 using the first attaching means.

Moreover, the light assembly 500 may include a first thermal transfer pad (not shown) configured to conduct heat, where the first thermal transfer pad is attachable to the heat sink 506 using a second attaching means. The light assembly 500 may also include a primary mounting plate configured to be attached to the first thermal transfer pad using the second attaching means. Further, the light assembly 500 may include a second thermal transfer pad configured to conduct heat, where the second thermal transfer pad is attachable to the primary mounting plate using the second attaching means.

In addition, the light assembly 500 may include a board 508 configured to be attached to the second thermal transfer pad using the second attaching means. The light assembly 500 may also include LED Array 510 configured to generate light, where the LED Array 510 is mounted on the board 508. Further, the light assembly 500 may include a lens mounting plate (not shown) configured to be attached to the primary mounting plate using a third attaching means, where the lens mounting plate is transparent to the light emitted by the LED Array 510. The light assembly 500 may include multiple lens mount standoffs configured to maintain a predetermined distance between the lens mounting plate and the primary mounting plate when the lens mounting plate is attached to the primary mounting plate. Further, a lens may be configured to collimate light emitted from the LED Array, where the lens may be disposed over the lens mounting plate. Yet further, a lens retainer may be configured to be attached to the lens mounting plate using a fourth attaching means, where attaching the lens retainer to the lens mounting plate secures a placement of the lens on the lens mounting plate.

Figure 7:
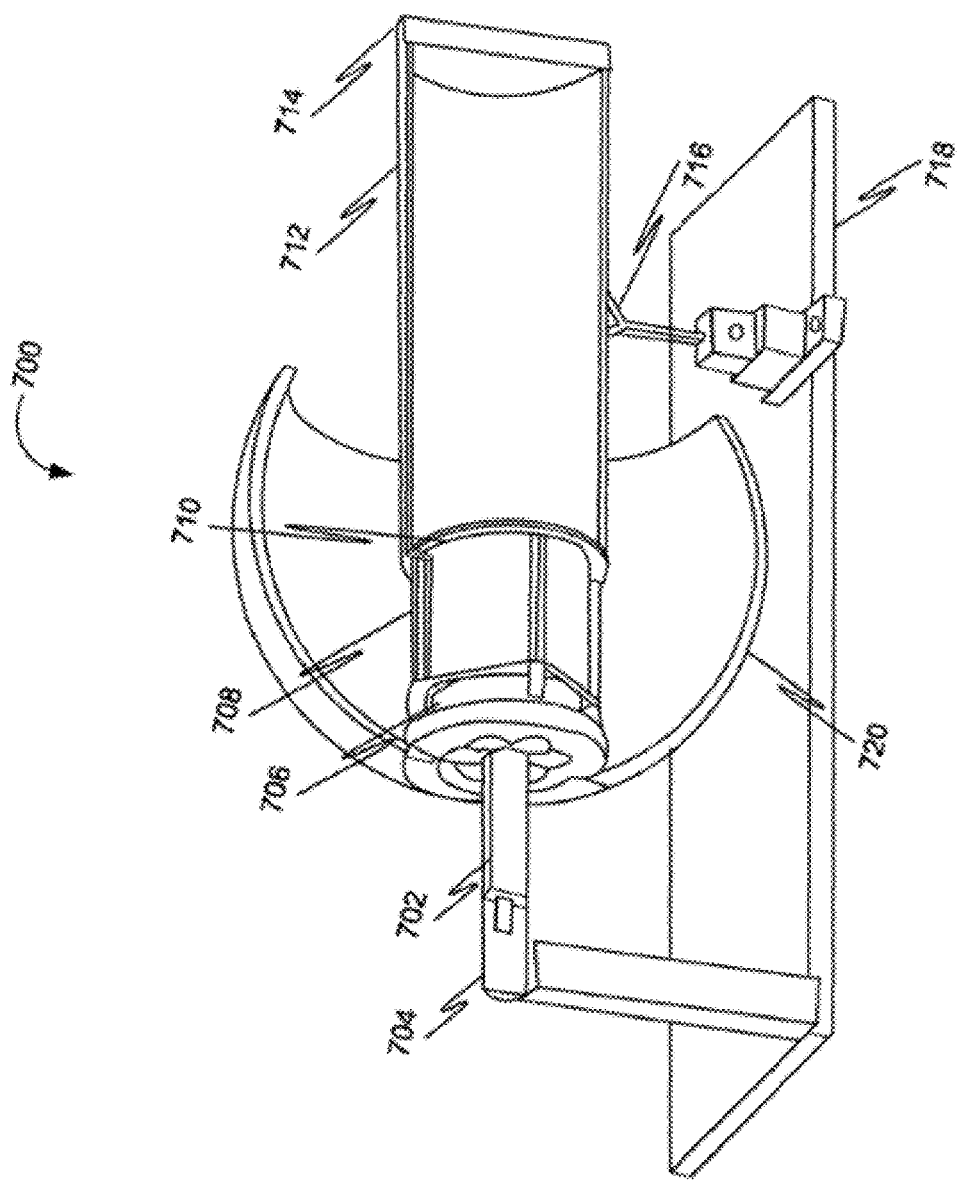
FIG. 7 shows a perspective view of a light assembly retrofitted in a movie theatre projector, in accordance with some embodiments.

FIG. 7 shows a perspective view of a light assembly 700 retrofitted in a movie projector, in accordance with some embodiments. The light assembly 700 may include an adaptor 702 configured to mechanically couple with a bulb mount 704 of the movie projector. Further, the light assembly 700 may include one or more cooling fans 706 configured to generate airflow, where the one or more cooling fans 706 may be attachable to the adaptor 702 using a first attaching means.

Moreover, the light assembly 700 may include a heat sink 708 configured to dissipate heat, where the heat sink 708 may be attachable to the one or more cooling fans 706 using the first attaching means. The light assembly 700 may also include a first thermal transfer pad configured to conduct heat, where the first thermal transfer pad is attachable to the heat sink 708 using a second attaching means. Further, the light assembly 700 may include a primary mounting plate configured to be attached to the first thermal transfer pad using the second attaching means. Yet further, a second thermal transfer pad may be configured to conduct heat, where the second thermal transfer may be attachable to the primary mounting plate using the second attaching means.

In addition, the light assembly 700 may also include a board 710 configured to be attached to the second thermal transfer pad using the second attaching means. Further, the light assembly 700 may include LED Array configured to generate light, where the LED Array is mounted on the board 710. Yet further, a shroud 712 configured to collimate light generated by the LED Array onto a projector lens 714 comprised in the movie theatre projector, where the shroud 712 is configured to be attached to the board 710. In an embodiment, the shroud 712 may be configured to be attached to the lens mounting plate by a fastener, such as, but not limited to, screws. Accordingly, the shroud 712 may be rigidly attached to the lens mounting plate while being freely movable with respect to the movie theatre projector lens.

Further, the light assembly 700 may also include an adjustment rod 716 configured to adjust an alignment of the light assembly 700 in relation to the projector lens, where a foot portion of the adjustment rod 716 is configured to be immovably mounted on a base 718 of the movie theatre projector, where a head portion of the adjustment rod is movably attachable to the shroud 712.

Further, the adaptor 702 may be configured to form a tight contact with an interior surface of a projector shroud 720 comprised in the movie theatre projector, where the tight contact directs air flow for cooling, and where the light assembly 700 may be configured to be disposed within an interior volume of the projector shroud 720.

Figure 8A:
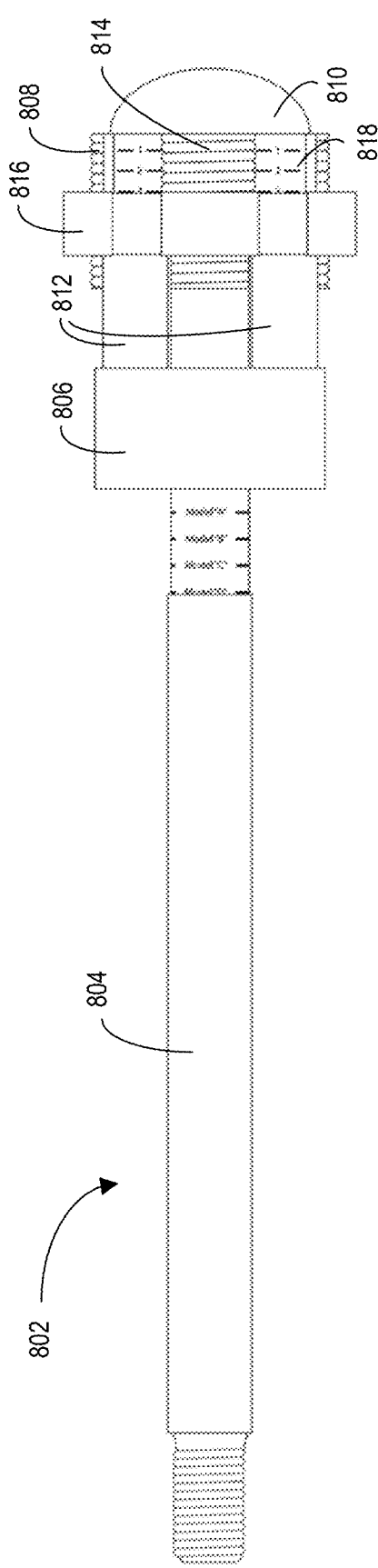
FIGS. 8A-8B show perspective views of a light assembly retrofitted in a movie theatre projector and including an attachment assembly, in accordance with some embodiments.
Figure 8B:
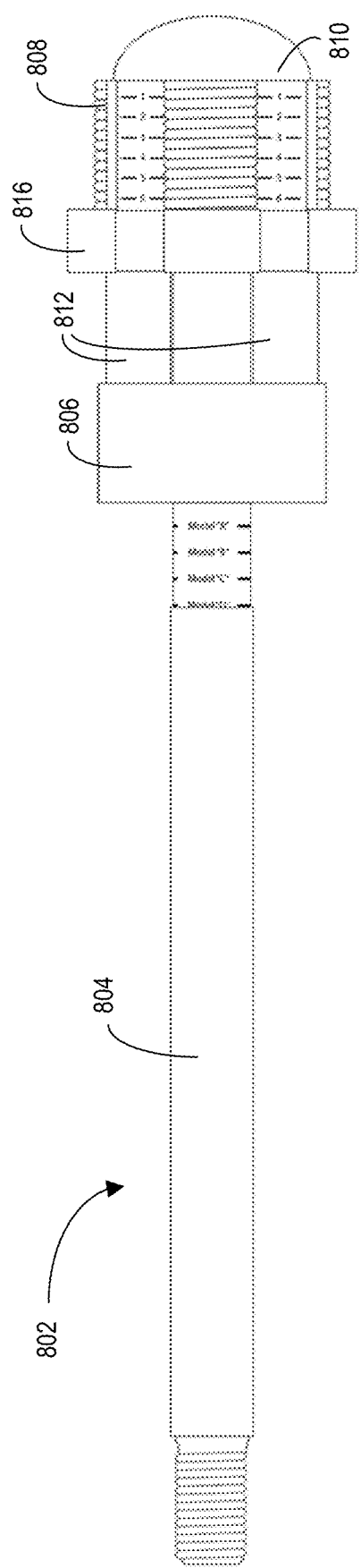

FIGS. 8A-8B show perspective views of a light assembly retrofitted in a movie theatre projector and including an attachment assembly, in accordance with some embodiments. FIG. 8A shows an adaptor 802 with an elongated portion 804. Primary mount 806 is attached to lens mount 808, in which lens 810 is disposed over the lens mount 808. The primary mount 806 is attached to the lens mount 808 by an attachment assembly that enables the adjustment of the position of the lens mount 808 with respect to the primary mount 806. The attachment assembly or a portion of the attachment assembly may be manipulated (e.g., by rotation or twisting) so as to adjust the distance between the LEDs on the primary mount 806 and a lens aperture involving the lens 810.

For example, the primary mount 806 may be attached to arms 812 that contain the lens mount 808. The lens mount 808 is able to move towards and away from the primary mount 806 while contained within the arms 812. The lens mount 808 may have threaded portions 814 on the outer sides of the lens mount 808 that protrude from the lens mount through the gaps in the arms 812 and are used to guide the lens mount 808 towards and away from the primary mount 806. A collar ring 816 that is threaded on its inner circumference surrounds the arms 812 and the lens mount 808. The threaded portions 814 on the outside of the lens mount 808 engage the threaded portion on the inside of the collar ring 816. The arms 812, the threaded portions 814 and/or the collar ring 816 may be considered an attachment assembly for attaching the primary mount 806 to the lens mount 808 in such a way that the distance between them can be adjusted by manipulation of the attachment assembly or at least a portion of the attachment assembly.

When the collar ring 816 is rotated or twisted in one direction, the lens mount 808 travels away from the primary mount 806, such that the distance between the LED emitters on the primary mount 806 and the lens 810 increases. The before and after positions of this manipulation are shown, respectively, by FIGS. 8A and 8B. When the collar ring 816 is rotated in the other direction, the lens mount 808 draws back towards the primary mount 806. There may be markings 818 that indicated what mark the lens mount 808 is to be moved to based on the type of conventional bulb that is being replaced by the light assembly. The attachment assembly may also be a "twist-lock" system that locks in place at each of the settings.

FIGS. 9A-9B show perspective views of a light assembly retrofitted in a movie theatre projector with an adjustable adaptor, in accordance with some embodiments. FIG. 9B shows the elongated portion 804 of the adaptor 802 adjusted to be shorter than the elongated portion 804 shown in FIG. 9A. The adjustment may be made by manipulation (e.g., rotation or twisting) of the adaptor 802, or the elongated portion 804 of the adaptor 802. This adjustment changes the distance between the bulb mount 402 and ultimately the primary mount 806. This may also be a twist-lock system that can be adjusted to markings (e.g., for model "A", model "B", etc.) based on the conventional bulb model being replaced. These adjustable features provide for in-place sizing of the light assembly (e.g., without changing out attachment assembly parts) that accounts for different sizes of the conventional bulb that is being replaced.

Figure 10:
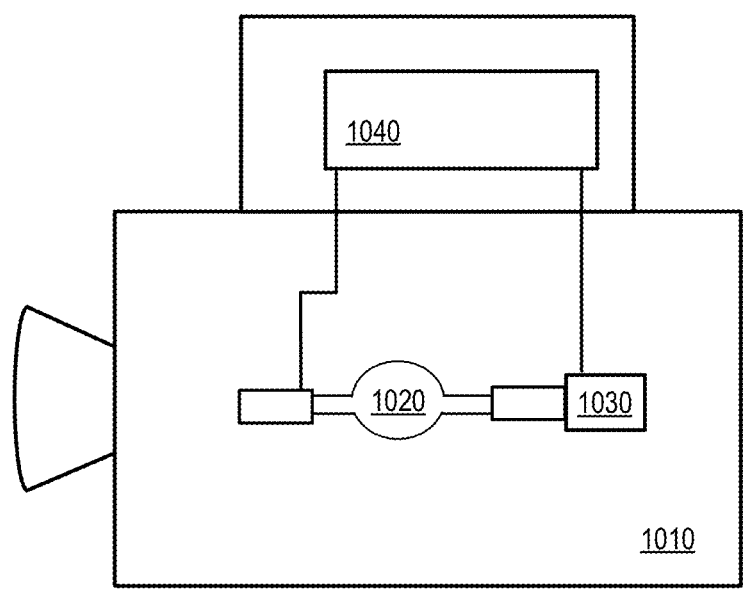
FIG. 10 shows a diagram of an existing movie theatre projector.

FIG. 10 illustrates a movie theatre projector 1010 in an existing setup with a HID bulb 1020 that is inserted into bulb mount 1030. The operation of the HID bulb 1020 is controlled by an existing control system 1040. In the example setup of FIG. 10, the existing control system 1040 is located on the projector 1010.

Figure 11:
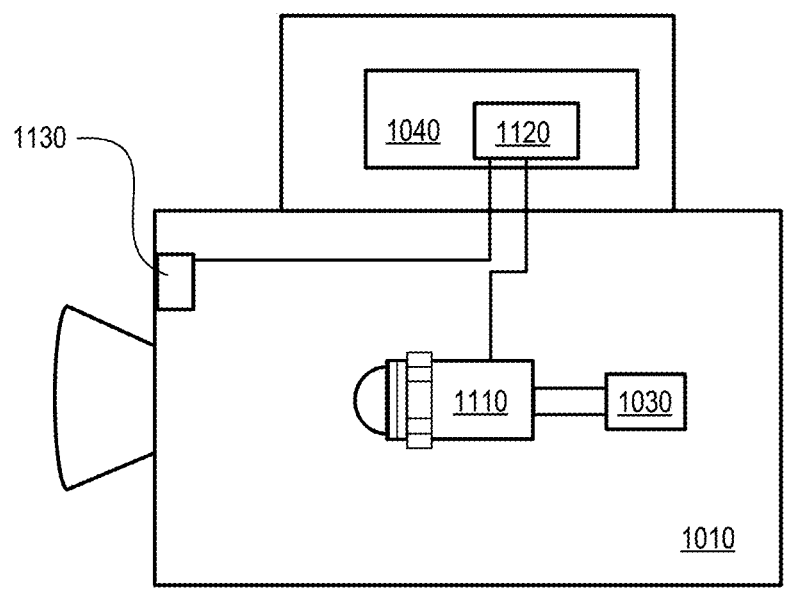
FIG. 11 shows a diagram of a light assembly system installed in the movie theatre projector with a standalone light assembly control system, according to some embodiments.

According to some embodiments, upon removal of the HID bulb 1020, light assembly 1110 may be inserted in its place, as shown in the example setup of FIG. 11. Similar to the embodiments described above, the light assembly 1110 includes an adaptor that is configured to mechanically couple to the bulb mount 1030. The light assembly 1110 includes a lens and at least one LED directly or indirectly attached to a primary LED emitter mounting plate. The light assembly 1110 further includes a cooling assembly, which may be any combination of a heat sink, a cooling fan and thermal pads.

According to some embodiments, the light assembly 1110 is controlled by a new component, a light assembly control system 1120. The light assembly control system 1120 may be a standalone system that is external to the light assembly 1110. Rather than having to reprogram the software in the existing control system 1040 and reconfigure the existing control system 1040 and/or the driver of the projector 1010 to account for the different power requirement of the LEDs, the standalone control system 1120 is configured to control the operation of the LEDs in the new light assembly 1110. The standalone control system 1120 may be configured to control a driver for the light assembly 1110 that is separate from any driver used for the bulb mount 1030 of the projector 1010. The standalone system 1120 may also control a cooling fan or any other components of the light assembly 1110.

By connecting the light assembly 1110 to its own control system 1120 (and driver), replacement of the HID bulb 1020 will not require extensive reconfiguration or reprogramming of the projector 1010. This is particularly important when different types, brands and models of projectors may each have their own software version and power configuration. The solution provided by the embodiments can be considered to be platform-independent, especially when the standalone control system 1120 is combined with the adaptor 802 and attachment assembly 812, 814, 816 described above.

The standalone control system 1120 may have its own accessible on/off controls or automatic timing controls. A display and a user entry keypad, dial or touchscreen may be used to manually control the light assembly 1110 or to program an automatic timing schedule. The driver for the light assembly 1110 may utilize the power source of the projector 1010 or its own power source. In some embodiments, the movie theatre projector power output will turn on and off the power to the light assembly control system 1120 and or the driver of the light assembly 1110.

In some cases, the standalone control system 1120 may be configured to communicate with the existing control system 1040 directly or indirectly, by a wired or wireless communication link. The communication may pertain to when the light assembly 1110 is to be on or off. As a result, any automatic timing or on/off operations of the projector 1010 may continue to be directed from the existing control system 1040 and carried out by the standalone control system 1120. For example, once the light assembly 1110 and the standalone control system 1120 are installed, an operator of the movie theater projector 1010 may turn the projector 1010 on and off from the display of the existing control system 1040. The standalone control system 1120 may detect that the light assembly 1110 should be on or off based on any signals detected from the existing control system 1040.

The power to the driver for the bulb mount 1030 may be disconnected or disabled upon replacement of the HID bulb 1020. In some cases, signals from the existing control system 1040 that are used to power the bulb mount 1030 may be detected and interpreted by the standalone control system 1120 to turn on or off the light assembly 1110 via the driver for the light assembly 1110. In other cases, the standalone control system 1120 may direct the power from the projector 1010 to the light assembly 1110.

According to further embodiments, the setup in FIG. 11 may include a sensor 1130, within or near the projector 1010, that provides feedback to the standalone control system 1120. The sensor 1130 may detect an amount of light emitted from the light assembly 1110. This may be useful in determining proper illumination by the light assembly 1110 or detecting any drop in luminance over the life of the LEDs. In some instances, the sensor 1130 may be located at the movie screen and provide feedback in wireless signals.

Figure 12:
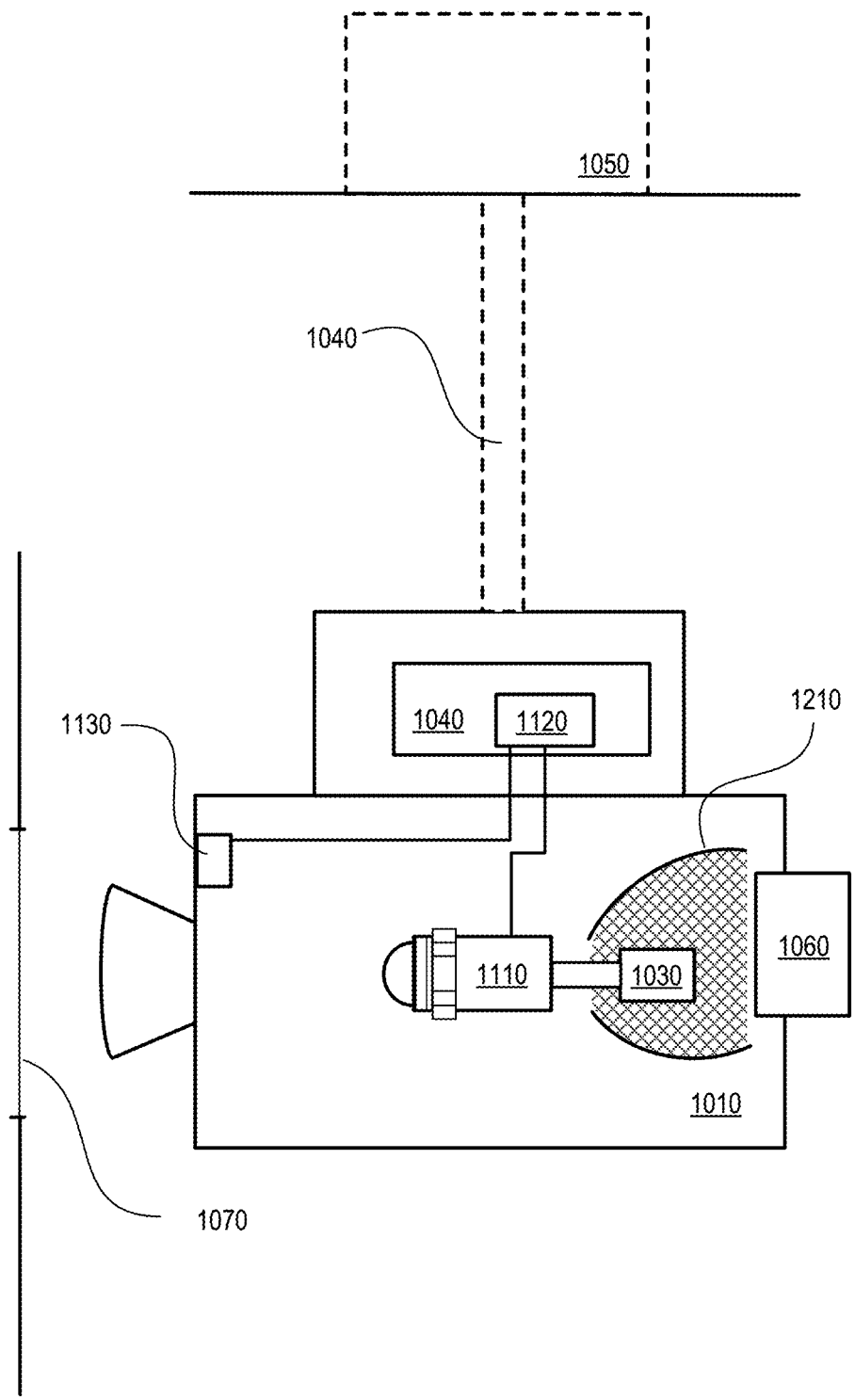
FIG. 12 shows a diagram of the light assembly system in the movie theatre projector with air ventilation components, according to some embodiments.

FIG. 12 illustrates another setup, according to some embodiments, where the projector 1010 sits in relation to a projector window 1070 and a ventilation system 1050 that circulates hot air from within the projector 1010 through vent 1040. The projector 1010 may also include a fan or other ventilation component 1060 that was normally used to pass air over the HID bulb 1020. In one example of this new setup, the light assembly 1110 may include a heat sink and a cooling fan to blow air over the heat sink. This cooling fan may controlled by the standalone system 1120 and may be powered by the same driver used to power the LEDs or a separate driver. The existing ventilation system 1040, 1050, 1060 may aid in this heat removal.

However, in another example of the setup of FIG. 12, the light assembly 1110 does not include a cooling fan, but only a heat sink. In this case, an air guide 1210 may be used to direct air pushed by ventilation component 1060 over the heat sink. The air guide 1210 may be a funnel with a hole at the heat sink of the light assembly 1110.

While the light assembly control system 1120 is described as a standalone system in the retrofit embodiments above, in some embodiments, the light assembly control system 1120 is configured to control the projector 1010 and any other operations of the projector 1010. The light assembly control system 1120 may be or may be integrated with the projector control system. This may be the case in new movie theatre projectors that are designed to account for the light assembly 1110. Such designs may still call for the light assembly 1110 to be adaptable.

Figure 13:
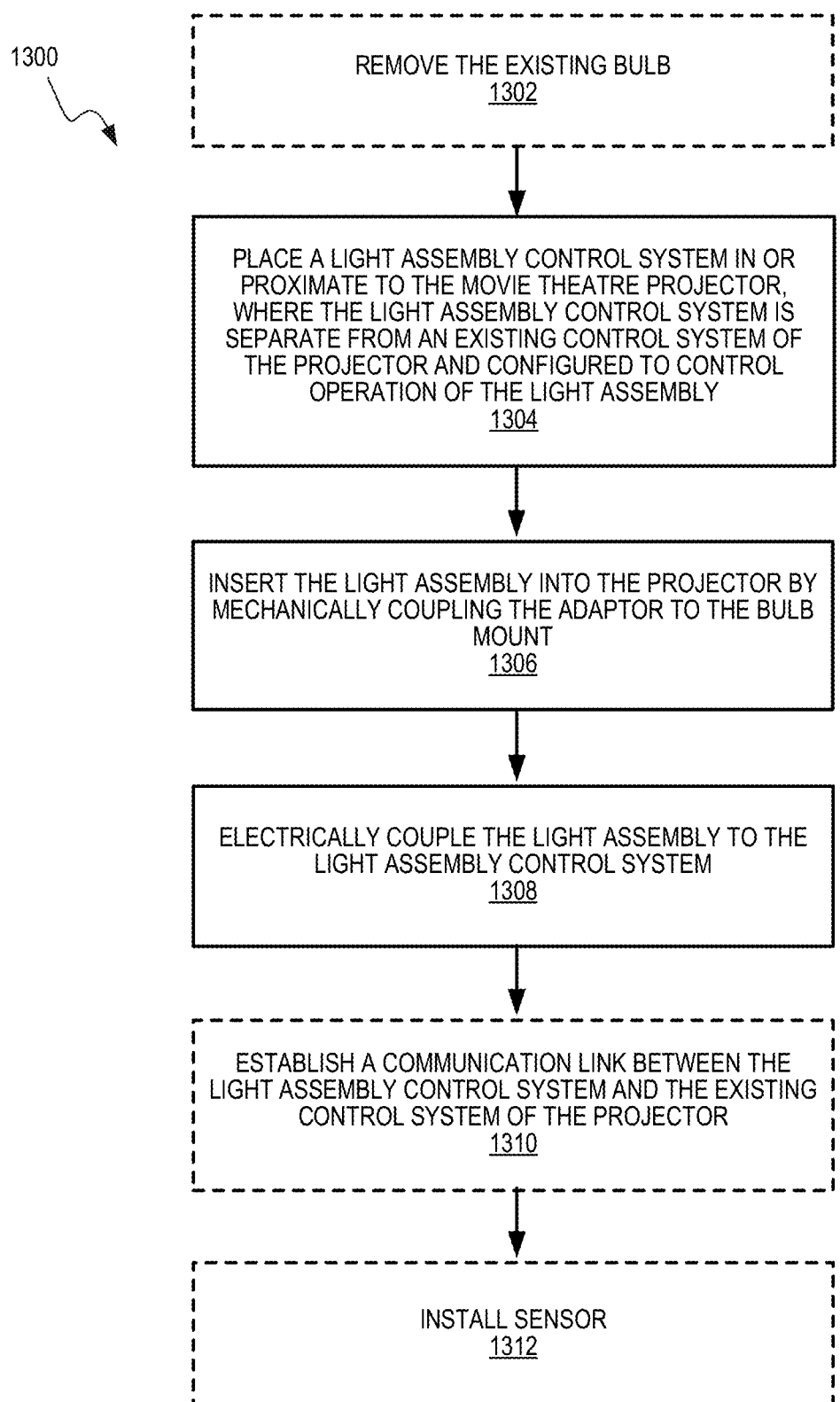
FIG. 13 is a flowchart showing a method of installing the standalone light assembly control system, according to some embodiments.

FIGS. 11 and 12 serve to illustrate components for retrofitting a movie theater projector bulb with an LED light assembly, in a manner that is efficient and cost-effective. FIG. 13 shows a flowchart that helps to describe such a retrofit method 1300, according to some embodiments. Upon removal of the existing bulb (and any unnecessary components that would hinder the installation of the light assembly 1110), shown by step 1302, the light assembly control system 1120 is placed in or proximate to the projector 1010 (step 1304). The assembly control system 1120 is separate from the existing control system 1040. This means that the assembly control system 1120, instead of the existing control system 1140, is controlling the operation of the LEDs of the light assembly 1110. The assembly control system 1120 may be considered separate from the existing control system 1040, even if the assembly control system 1120 utilizes signals from the existing control system 1040 to determine when the light assembly 1110 is to be on or off. The two systems may be physically separate or placed next to each other for convenience. They may share the same power source or the light assembly control system 1120 may utilize a separate power source. Here, a power source may be a battery, a power conversion box or a transformer that is capable of fitting within the projector.

The light assembly 1110 may be placed in the projector 1010 by mechanically coupling the adaptor of the light assembly 1110 to the bulb mount 1030 of the projector (step 1306). The light assembly 1110 may be electrically coupled to the light assembly control system 1120 (step 1308) so that the light assembly may be controlled and powered. The light assembly may be operated solely by the light assembly control system 1120. In some embodiments, a communication link (wired or wireless) is established between the systems (step 1310). This may be a link to simply indicate when the light assembly 1110 is to be on or off. The light assembly control system 1120 may be configured to detect signals or receive instructions from the existing control system 1040 with regard to when the light assembly 1110 is to operate.

There may also be a more extensive exchange of information or signaling between the systems when there is a greater level of integration. The purpose of the link is to allow for a simpler installation with minimal reconfiguration of the existing projector setup. There may be a software update to the existing control system and/or a simple adjustment to utilize a communication link between the systems. However, the complexity, cooling system management, and particular power requirements of the LEDs may be left to the new light assembly control system 1120. The method 1300 may also include installation of a sensor (step 1312) to provide feedback to the light assembly control system 1120. The method 1300 of FIG. 13 is just one an example of the retrofit process and the order of the steps may vary as necessary.

In some cases, an air guide 1210 may be installed to direct air over a heat sink of the light assembly 1110. This may be done whether the light assembly 1110 has a cooling fan or does not have a cooling fan. The light assembly control system 1120 may interface with the ventilation control system, if necessary, directly or through the existing control system 1040.

In various embodiments, the light assembly retrofit may be tailored for no interaction with the existing control system 1040 and projector components. On the other hand, the light assembly control system may be integrated with the existing control system 1040 and other projector components in varying degrees.

According to some embodiments, the light assembly 1110 is configured for easy replacement of the LEDs (and the cooling fan if there is one). This would involve the scenario where a light assembly has been in operation but has dimmed slightly below a light or efficiency threshold (likely undetectable to the customers). Rather than requiring the cost of a whole new light assembly, only the LEDs and cooling fan would need to be replaced. There is no need to replace the remaining core of the assembly. Therefore, the light assembly 1110 would be constructed such that removal of the LED emitter board is facilitated, such as by allowing the lens mount to come off upon twisting the attachment assembly collar all the way.

Figure 14:
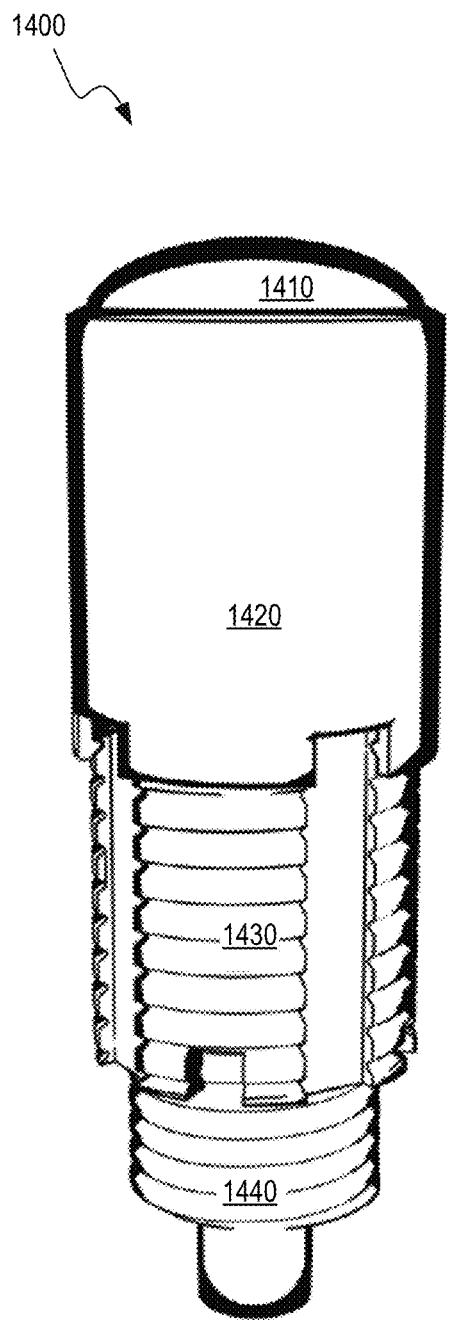
FIG. 14 shows a perspective view of a light assembly retrofitted in a movie theatre projector and including an attachment assembly with three tiers, in accordance with some embodiments.
Figure 15:
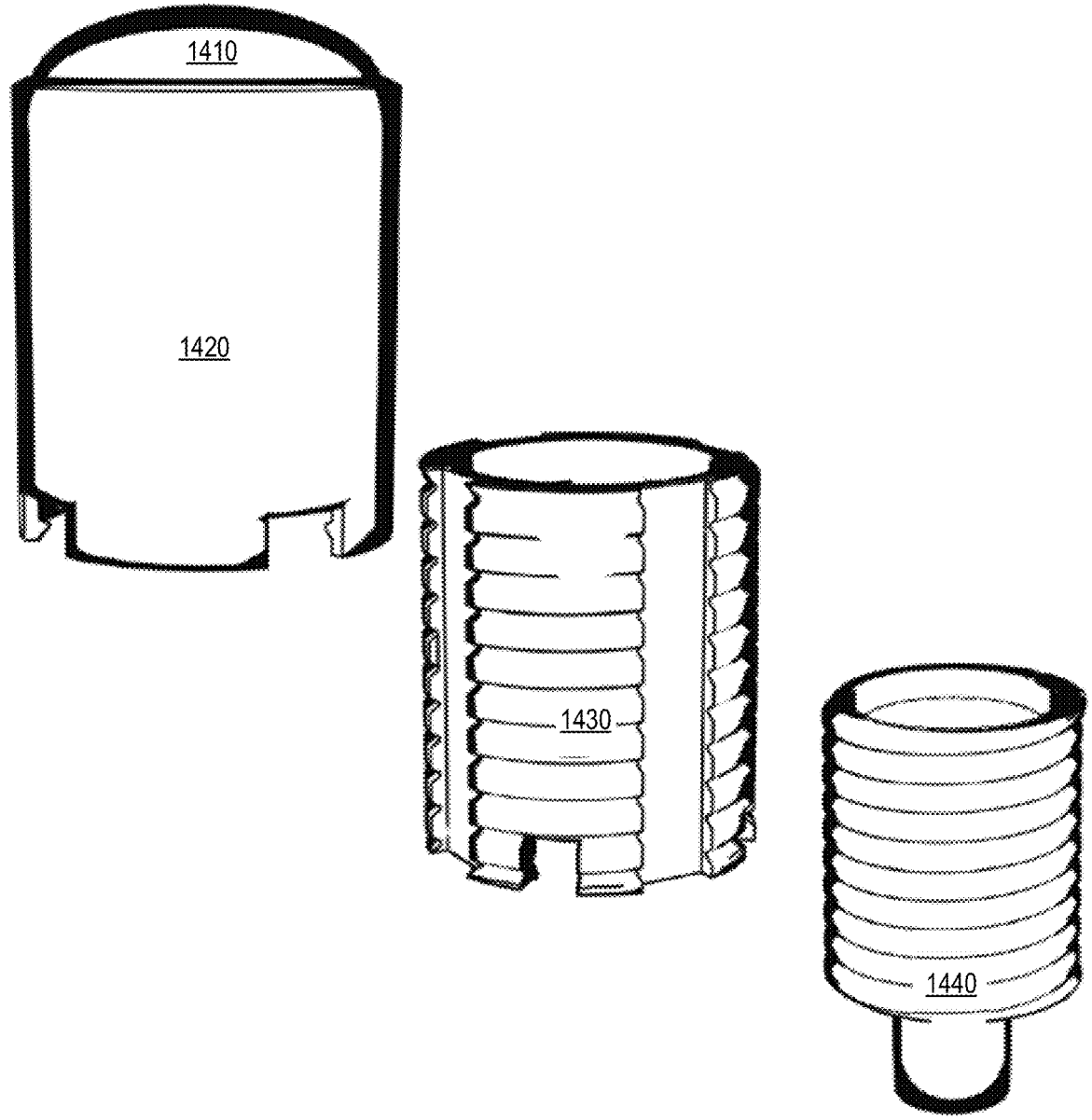
FIG. 15 shows an exploded view of the light assembly of FIG. 14, in accordance with some embodiments.

FIGS. 14 and 15 shows perspective views of a light assembly that is retrofitted in a movie theatre projector and that includes an attachment assembly, in accordance with some embodiments. This lighting assembly is configured to project a beam in the shape of a square or some other quadrilateral shape. The shape is generated by the placements of one or more LEDs on the LED Emitter plate. The LEDs may be part of a COB configured to generate the square beam.

The light assembly includes an attachment assembly 1400 that may be manipulated to adjust the distance between the lens 1410 and the LED Emitter plate housed within emitter housing 1440, which is attached to and/or includes the cooling assembly.

FIG. 14 shows the attachment assembly 1400 as three tiers, including a primary adjustor 1420, a secondary adjustor 1430 and the emitter housing 1440. The lens 1410 is attached to the primary adjustor 1420, such as at the top or end of the attachment assembly 1410. The primary adjustor 1420 may be cylindrical and hollow, so as to allow light to pass from the LED Emitter to the lens 1410.

The primary mount 806 is attached to the lens mount 808 by an attachment assembly that enables the adjustment of the position of the lens mount 808 with respect to the primary mount 806. The attachment assembly or a portion of the attachment assembly may be manipulated (e.g., by rotation or twisting) so as to adjust the distance between the LEDs on the primary mount 806 and a lens aperture involving the lens 810.

For example, the primary mount 806 may be attached to arms 812 that contain the lens mount 808. The lens mount 808 is able to move towards and away from the primary mount 806 while contained within the arms 812. The lens mount 808 may have threaded portions 814 on the outer sides of the lens mount 808 that protrude from the lens mount through the gaps in the arms 812 and are used to guide the lens mount 808 towards and away from the primary mount 806. A collar ring 816 that is threaded on its inner circumference surrounds the arms 812 and the lens mount 808. The threaded portions 814 on the outside of the lens mount 808 engage the threaded portion on the inside of the collar ring 816. The arms 812, the threaded portions 814 and/or the collar ring 816 may be considered an attachment assembly for attaching the primary mount 806 to the lens mount 808 in such a way that the distance between them can be adjusted by manipulation of the attachment assembly or at least a portion of the attachment assembly.

When the collar ring 816 is rotated or twisted in one direction, the lens mount 808 travels away from the primary mount 806, such that the distance between the LED emitters on the primary mount 806 and the lens 810 increases. The before and after positions of this manipulation are shown, respectively, by FIGS. 8A and 8B. When the collar ring 816 is rotated in the other direction, the lens mount 808 draws back towards the primary mount 806. There may be markings 818 that indicated what mark the lens mount 808 is to be moved to based on the type of conventional bulb that is being replaced by the light assembly. The attachment assembly may also be a "twist-lock" system that locks in place at each of the settings.

In some embodiments, the light assembly may be designed to make the size of the projected light footprint on the movie screen adjustable. The light assembly can adjust the size or pitch of the beam with a concave lens that moves toward or away from a convex lens by manual adjustment. This feature of the light assembly provides movie projector operators a quick and easy way to account for different distances between the projector and the screen.

FIG. 14 illustrates a portion of a lighting assembly 1400 that makes the size of the projected footprint adjustable. The lighting assembly may include an adaptor (not shown) that is configured to mechanically couple to a bulb mount of the movie theatre projector. Lighting assembly 1400 includes an emitter housing 1440 that includes an LED emitter plate inside, with at least one LED directly or indirectly attached to the LED emitter plate. The LED or LEDs are configured to emit a beam of light. A cooling assembly, as described in earlier embodiments, may be inside and/or attached to emitter housing 1440 in order to dissipate heat from the LED emitter plate. To this end, emitter housing 1440 may be perforated or grilled to allow heat to escape.

The LEDs on the LED emitter plate, also referred to as an LED emitter, may be configured to emit light in different shapes, either my LED placement on the LED emitter plate or by a light filter. For example, the beam may be quadrilateral in shape to match a screen shape. This beam may be generated by a single square or rectangle LED or by an array of LEDs placed to generate a quadrilateral shape. The LEDs may be a part of a COB or other arrangement.

Lighting assembly 1400 may include a lens assembly configured to adjust the size or pitch of the beam. To enable this adjustment, the lens assembly includes a concave adjustor 1430 with a concave lens inside (not visible in FIG. 14) that is configured to spread the beam emitted from the LEDs and a convex adjustor 1420 with a convex lens 1410 that is configured to collimate light received from the concave lens. Concave adjustor 1420 is movably attached to emitter housing 1440 and convex adjustor 1420. The lens assembly 1400 is configured to be manipulated by hand or machine to adjust a distance between the concave lens inside concave adjustor 1430 and convex lens 1410, thereby adjusting the size or pitch of the beam.

FIG. 15 shows that the emitter housing 1440, concave adjustor 1430 and convex adjustor 1420 of the three-tier lens assembly may be cylindrical in shape and substantially hollow to allow the beam of light emitted from the LEDs to pass through and exit lens assembly 1400. As seen in FIGS. 14 and 15, at least part of the inside of convex adjustor 1420 is formed with a screw-like or helix-like pattern in order to allow concave adjustor 1430 to rotate inside part of convex adjustor 1420. Rotation of concave adjustor 1430 moves it up or down within convex adjustor 1420. This attached rotational movement decreases or increases the distance between the concave lens and convex lens 1410. This same rotational attachment exists between the outside of emitter housing 1440 and at least part of the inside of concave adjustor 1430. The rotation of concave adjustor 1430 with respect to emitter housing 1440 can be used adjust the overall length of the light assembly and/or how the concave lens receives the light emitted from the LEDs. While rotation or twisting is described here, other designs may use simple straight sliding or other methods of manipulation, internally or externally, may be used to adjust the lens distances or positions. In some embodiments, one or both of the adjustors may be more permanently attached.

Figure 16A:
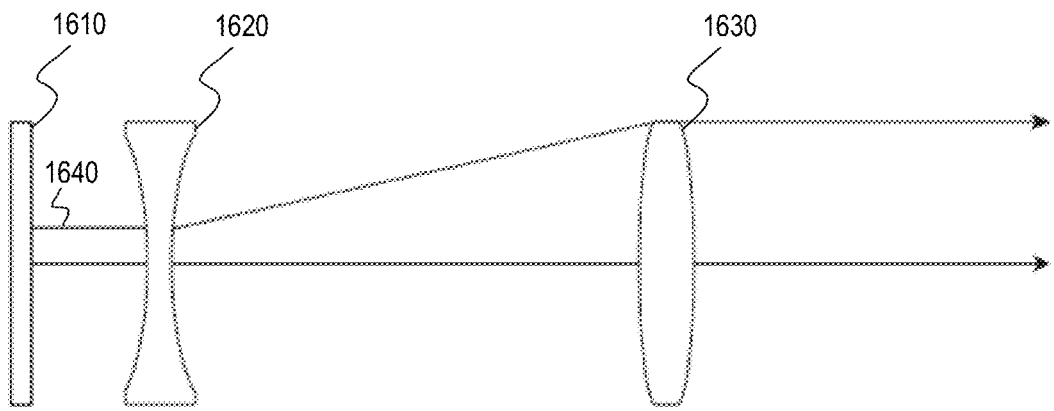
FIGS. 16A-16C illustrate an adjustment of the distance between a concave lens and a convex lens, according to some embodiments.
Figure 16B:
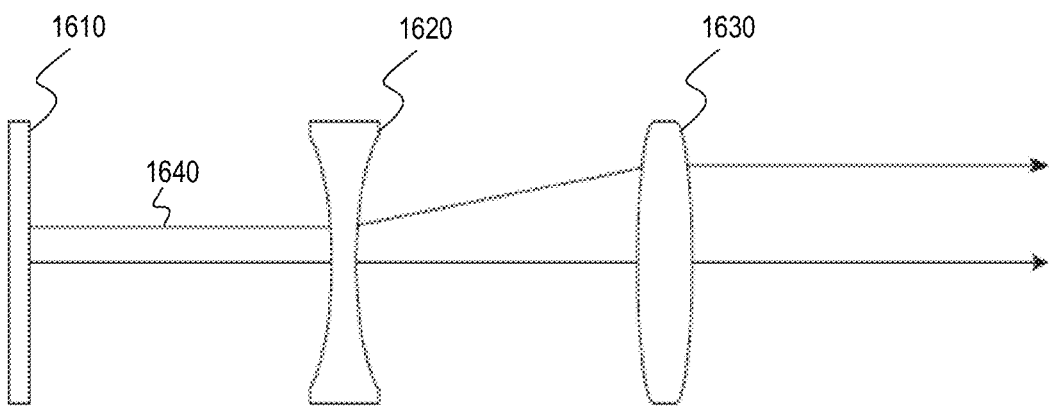
Figure 16C:
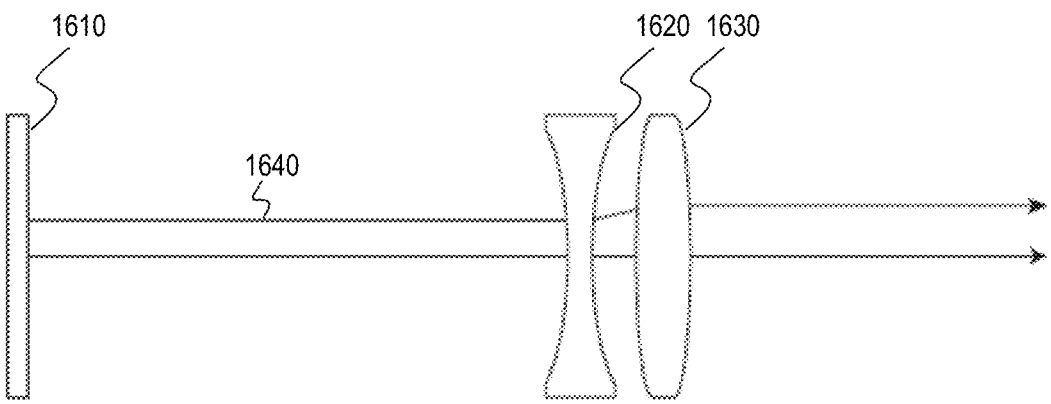

FIGS. 16A-16C show the inside components of the lens assembly, according to some embodiments. FIG. 16A shows LED emitter plate 1610 positioned within emitter housing 1440. LED emitter plate 1610 emits light beam 1640. The "beam" may be formed of light rays that are substantially parallel and that hold a shape (e.g., square or rectangular). A beam may also include rays of light that are more dispersed. Beam 1640 passes through concave lens 1620 in concave adjustor 1430. Concave lens 1620 acts to disperse beam 1640 so as to expand its size. The dispersed light or enlarged beam is received by convex lens 1630 in convex adjustor 1420, where convex lens 1630 collimates or shapes beam 1640 to be parallel (or back to being parallel), but now at a different size.

FIG. 16B shows, that by rotation of concave adjustor 1430, the distance between concave lens 1620 and convex lens 1630 is reduced, resulting in an emitted beam 1640 that is smaller in size or pitch than in FIG. 16A. FIG. 16C shows a further reduction in the distance, by rotation of concave adjustor 1430 and/or convex adjustor 1410. The size or pitch of emitted beam 1640 is even smaller. Although the change in the distance between concave lens 1620 and convex lens 1630 shows a change in the beam size in the figures, the change in distance between LED emitter plate 1610 and concave lens 1620 may also change the beam. Ultimately, by this new design, the size of emitted beam 1640 can be adjusted to correspond to the size of the movie theatre screen and the distance from the projector to the screen.

FIGS. 17A-17C illustrate an example of a cooling assembly 1700 with additional cooling features, according to some embodiments. Similar to the cooling assemblies shown in FIGS. 3, 5 and 6, FIG. 17A shows a cooling assembly 1700 that includes a cooling fan 1702 that passes air over a heat sink 1704. However, in this embodiment, cooling assembly 1700 includes a cooling fluid jacket 1706 between heat sink 1704 and the LED emitter plate 1708. Cooling assembly 1700 is configured to run cooling fluid (e.g., refrigerant that will not freeze at lower temperatures) through jacket 1706 to help bring down the temperature of LED emitter plate 1708, which is heated by the LEDs 1710.

LEDs 1710 will generate some heat. In some embodiments, LEDs 1710 may be arrayed in a 3-inch square area but use 2,200 W of power. This may be 4-5 times the amount of power used for some LED external lighting (e.g., 480 W), where the lighting is provided from a larger surface area that may be 10-14 inches wide and 20-26 inches long. LEDs 1710 can produce between 210,000 and 280,000 lumens of light.

Jacket 1706 and/or LED emitter plate 1708 may be embedded with sensors 1712 that pass on temperature information to a control system for the light assembly (e.g., control system 1120 in FIG. 12), to control the flow of cooling fluid from jacket 1706 to one or more cooling sections through conduits 1714 (e.g., hoses or pipes). In some cases, sensors 1712 will be embedded in jacket 1706 against the portion of LED emitter plate 1708 to which jacket 1706 is attached. Examples of these cooling sections are shown in FIG. 17B. A pump 1716 may move heated cooling fluid from jacket 1706 in the emitter housing of the light assembly to cooling fluid jacket 1718 of a cooling section. Heat is drawn out of the cooling fluid in jacket 1718 using Peltier plates 1720 that are oriented such that the cooler side is against jacket 1718. The heat from the hotter side of Peltier plates 1720 transfers to heat sink 1722, which is cooled by additional fans 1724. The cooling fluid is then returned to jacket 1706. FIG. 17C shows a side view of one of the cooling sections.

As mentioned above, Peltier plates may be used in the cooling sections, as opposed to a compressor and dryer or other cooling means. A Peltier plate uses thermoelectric cooling to create a heat flux at the junction of two different types of materials (Peltier effect). Each of Peltier plates 1720 comprises layers of the different materials to transfer heat from one side of the plate to the other, depending on the direction of a direct electrical current supplied to the plate. For clarity, FIG. 17B does not show the electrical wires of Peltier plates 1720 that may receive current from the light assembly control system or another power source.

As shown in FIG. 17B, there could be two or more of these cooling sections that are connected by fluid conduits. These cooling sections may be encapsulated together in some type of foam, while leaving the fans exposed for air movement. The encapsulated cooling sections may form one unit (with or without legs) that will be mounted just outside of or near the movie theatre projector. The cooling sections and jackets may be constructed of copper, aircraft grade aluminum, or other materials with high heat-conductive properties.

Some of these cooling sections may be operating before the heated cooling fluid is moved from jacket 1706. In this sense, these cooling sections are pre-chilling or super-chilling the portion of the cooling fluid that resides in their respective cooling fluid jackets.

In some embodiments, the cooling fluid coming out of jacket 1706 may be pre-cooled with additional pre-cooler fans. That is, the cooling fluid may circulate between one fan that pushes air over the cooling fluid and another fan that pulls the air over the cooling fluid. This may be a second stage of the cooling, where the first cooling fan 1702 is the first stage and the cooling sections are the third stage.

Figure 18A:
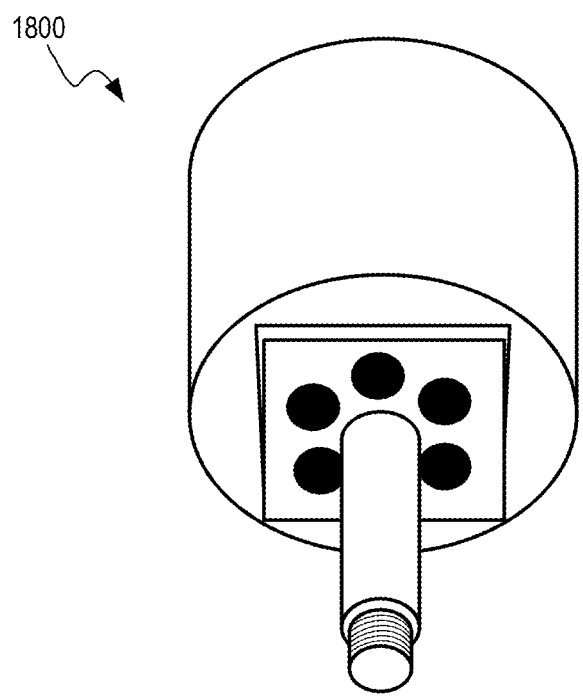
FIGS. 18A-18B illustrate a light assembly that houses the cooling assembly portion shown in FIG. 17A, according to some embodiments.
Figure 18B:
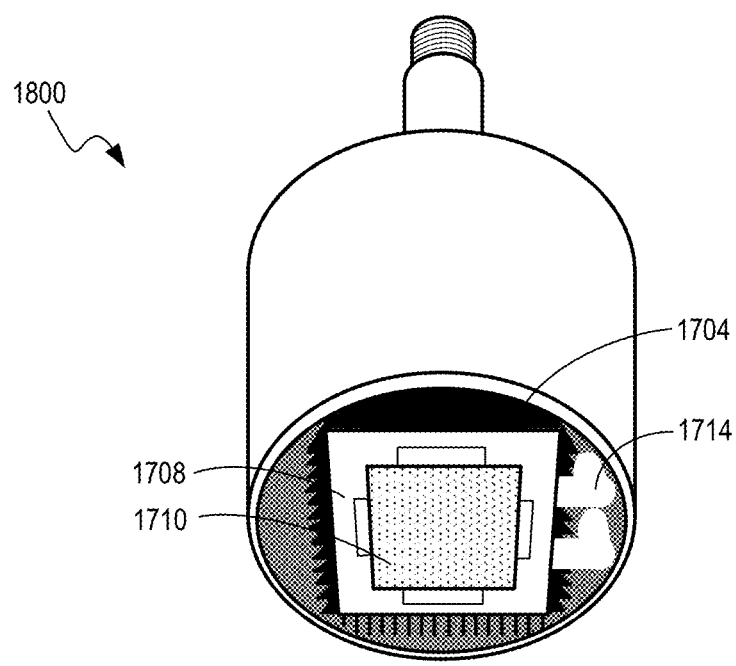

FIGS. 18A-18B illustrate different views of a light assembly that houses the cooling assembly portion shown in FIG. 17A, according to some embodiments. The cooling sections will be located elsewhere, outside of the movie theatre projector. The cooling fluid conduits 1714 that move cooling fluid to and from jacket 1706 can be seen in FIG. 18B.

Figure 19:
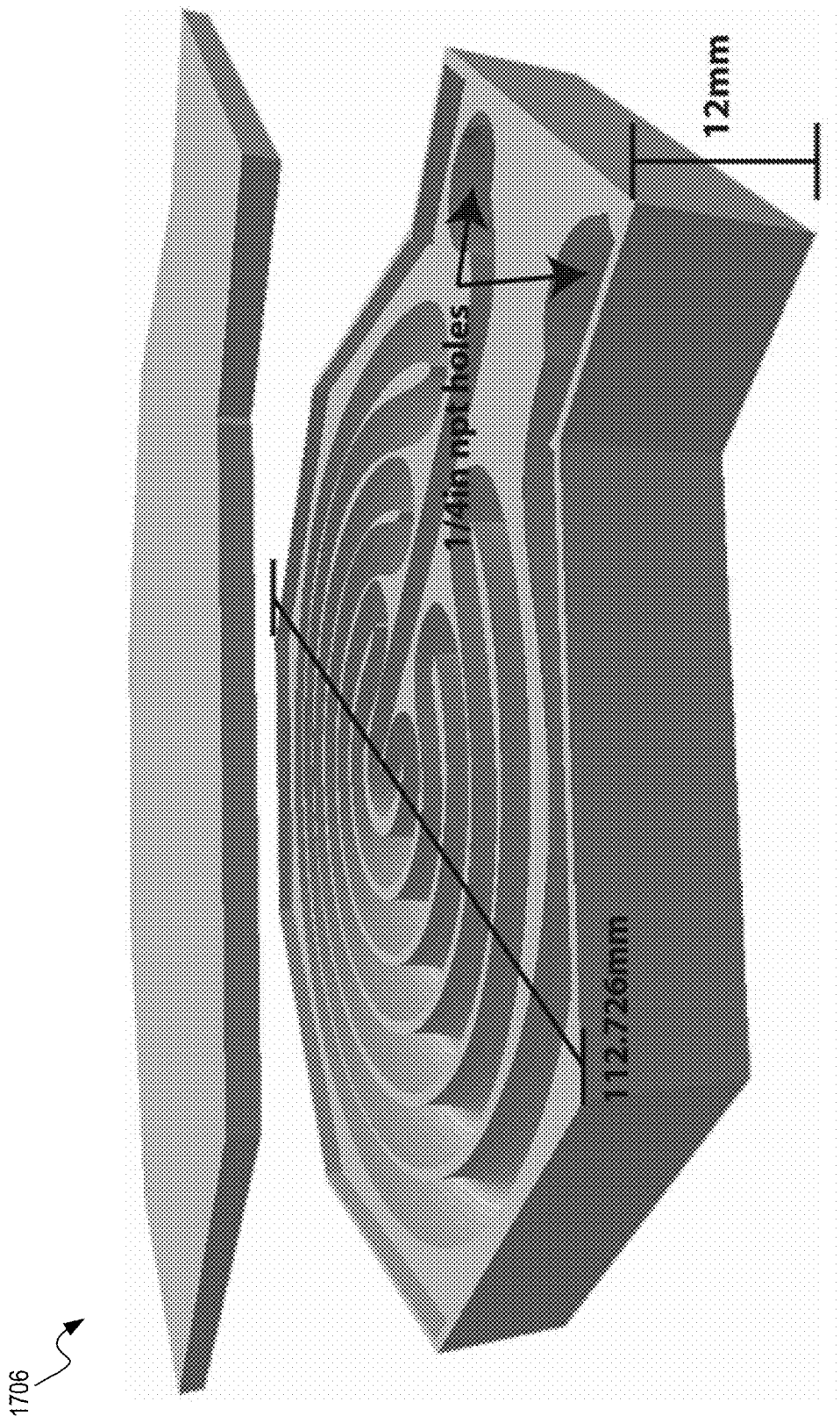
FIG. 19 illustrates an example internal design of a water jacket, according to some embodiments.

FIG. 19 illustrates an example internal design of a jacket, such as jacket 1706 or jacket 1718, according to some embodiments. In this example, cooling fluid flows in through one hole and towards the center of jacket 1706. The path then follows a tight circle around the center until the path must sharply turn back in the opposite direction. This pattern continues until the cooling fluid has passed by as much as the surface area of LED emitter plate 1708 as possible. The heated cooling fluid will then exit through another hole. In some cases, the pattern may be described as a spiral with multiple turns. The pattern may also be a parabolic spiral, such as a modified Fermat, logarithmic or Archimedean spiral. The path is not limited to these patterns and may be any pattern that corresponds to the surface area of jacket 1706.

The cooling sections may not be activated unless sensors 1712 determine that LED emitter plate 1708 has reached a certain temperature. Previously, cooling fan 1702 and heat sink 1704 may have been the sole means of dissipating the heat from LED emitter plate 1708. In these embodiments, cooling fan 1702 and heat sink 1704 may continue to operate when the cooling system with the cooling sections are activated. In some embodiments, the cooling assembly control system may activate the pre-cooler fans, described above, as the second stage, before activating the fans of the cooling sections, in a third stage. The first, second and third stages may be activated as necessary, according to the thresholds used by the cooling assembly control system and the information from sensors 1712. In some embodiments, various numbers of the fans and Peltier plates of the cooling sections may be activated by the cooling assembly control system, to provide a more incremental approach to cooling.

LEDs 1710 may be arrayed in different bulb designs to operate at different power levels. For example, one bulb may use 800 to 1500 W. Another bulb may use up to 3500 W. Another bulb could use up to 7000 W. The higher-powered bulbs would more likely need multiple stages of cooling.

A more complete lighting assembly with the advanced cooling assembly will be described. According to some embodiments, a light assembly, such as shown in FIG. 18A, FIG. 18B and previous figures, may include an adaptor configured to mechanically couple to a bulb mount of the movie theatre projector. The adaptor may be modified as shown in FIGS. 8A to 9B. The light assembly may also include an emitter housing, such as shown in FIGS. 18A and 18B, that includes an LED emitter plate and at least one LED directly or indirectly attached to the LED emitter plate and configured to emit a beam of light. The light assembly may include a lens assembly configured to collimate light emitted from the at least one LED. The lens assembly may include the lens adjustors that are shown in FIGS. 14-16C. The light assembly may further include a cooling assembly configured to dissipate heat from the LED emitter plate, where the cooling assembly includes a first cooling fluid jacket coupled to the LED emitter plate, where the first cooling fluid jacket comprises a metal layer enclosing a hollow path for cooling fluid, and where the first cooling fluid jacket is configured to allow the cooling fluid to pass into the first cooling fluid jacket, along the path and out of the first cooling fluid jacket, thereby drawing heat from the LED emitter plate. The cooling assembly may include a first heat sink coupled to the first cooling fluid jacket and a first cooling fan configured to pass air over the first heat sink. While a metal layer is described in this embodiment, the metal layer does not need to be exclusively metal. Furthermore, other non-metal materials may be used for the layer.

The cooling assembly may include one or more cooling fluid conduits and one or more cooling sections configured to receive, via the cooling fluid conduits, the cooling fluid from the first cooling fluid jacket, cool the cooling fluid and return the cooling fluid to the first cooling fluid jacket. Each of the cooling sections may include a second cooling fluid jacket configured to receive and return the cooling fluid, one or more Peltier plates configured to transfer heat from the second cooling fluid jacket, a second heat sink configured to dissipate heat from the Peltier plates and one or more second cooling fans configured to pass air over the second heat sink. The cooling fluid conduits may pass in and out of the emitter housing.

The cooling assembly may include one or more temperature and/or other sensors coupled to or embedded within the first cooling fluid jacket, the LED emitter plate and/or the first heat sink. The cooling assembly may include a cooling control system configured to, based on a comparison of temperature information from the temperature sensors to a given temperature threshold, activate a pump to move the cooling fluid between the first cooling fluid jacket and the cooling sections.

The light assembly may further include pre-cooling fans configured to cool the cooling fluid flowing in the fluid conduits from the first cooling fluid jacket to the cooling sections. This stage of cooling may be activated by the cooling control system based on information from the sensors.

As shown in FIG. 19, the path for the cooling fluid in a cooling fluid jacket may include a spiral with multiple turns. In some embodiments, the path may include at least part of an Archimedean spiral, a parabolic spiral, a logarithmic spiral or a Fermat spiral. The pattern of the cooling fluid path may be designed so as to include multiple turns in order to cover as much surface area as possible.

The cooling assembly may be configured to activate and deactivate the cooling fluid portion of the cooling assembly as necessary, to assist the cooling fan with moderating the temperature of the LED emitter plate. This may be functionality incorporated into the light assembly control system. This additional cooling may extend the life of the LEDs. The cooling sections utilize cooling fluid jackets and Peltier plates so that no compressor or dryer is needed for the cooling fluid. The pump and the fans are the only moving parts of the cooling sections. This means that the cooling assembly requires less maintenance and generates less noise, while providing an extra level of protection from high temperatures that may be the result of the movie theatre projector and its surrounding environment. In fact, these cooling sections can be smaller and more effective than other cooling systems used for other lighting, lasers, etc.

Although the invention has been explained in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

The invention claimed is:

1. A light assembly configured to be installed in a movie theatre projector, the light assembly comprising:
   an adaptor configured to mechanically couple to a bulb mount of the movie theatre projector;
   a Light Emitting Diode (LED) Emitter mounting plate;
   at least one LED directly or indirectly attached to the LED Emitter mounting plate;
   a heat sink configured to dissipate heat from the LED Emitter mounting plate;
   a cooling device configured to transfer heat away from the heat sink;
   a lens mounting plate; and
   a lens configured to collimate light emitted from the at least one LED, wherein the lens is disposed over the lens mounting plate.

2. A light assembly configured to be installed in a movie theatre projector, the light assembly comprising:
   an adaptor configured to mechanically couple to a bulb mount of the movie theatre projector;
   an emitter housing that comprises a Light Emitting Diode (LED) emitter plate;
   at least one LED directly or indirectly attached to the LED emitter plate and configured to emit a beam of light;
   a cooling assembly configured to dissipate heat from the LED emitter plate; and
   a lens assembly configured to adjust the size or pitch of the beam, the lens assembly comprising:
      a first adjustor comprising at least one first lens configured to spread the beam emitted from the at least one LED; and
      a second adjustor comprising at least one second lens configured to collimate light received from the at least one first lens, wherein the first adjustor is movably attached to the emitter housing and the second adjustor, and wherein the lens assembly is configured to be manipulated to adjust a distance between the at least one first lens and the at least one second lens, thereby adjusting the size or pitch of the beam.

3. A light assembly configured to be installed in a movie theatre projector, the light assembly comprising:
- an adaptor configured to mechanically couple to a bulb mount of the movie theatre projector;
- an emitter housing that comprises a Light Emitting Diode (LED) emitter plate;
- at least one LED directly or indirectly attached to the LED emitter plate and configured to emit a beam of light;
- a lens assembly configured to collimate light emitted from the at least one LED; and
- a cooling assembly configured to dissipate heat from the LED emitter plate, wherein the cooling assembly comprises:
  - a first cooling device coupled to the LED emitter plate, wherein the first cooling device is configured to draw heat from the LED emitter plate;
  - a heat sink coupled to the first cooling device; and
  - a second cooling device configured to pass a liquid or gas over the heat sink.

* * * * *